US012801966B2

(12) United States Patent
Igarashi

(10) Patent No.: US 12,801,966 B2
(45) Date of Patent: Nov. 17, 2026

(54) QUANTUM DEVICE AND CONFIGURATION METHOD THEREOF

(71) Applicant: NEC Corporation, Tokyo (JP)

(72) Inventor: Yuichi Igarashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 720 days.

(21) Appl. No.: 18/235,035

(22) Filed: Aug. 17, 2023

(65) Prior Publication Data

US 2024/0062089 A1 Feb. 22, 2024

(30) Foreign Application Priority Data

Aug. 19, 2022 (JP) ................................ 2022-131173

(51) Int. Cl.
*G06N 10/40* (2022.01)

(52) U.S. Cl.
CPC .................................... *G06N 10/40* (2022.01)

(58) Field of Classification Search
USPC .......................................................... 716/100
See application file for complete search history.

(56) References Cited

U.S. PATENT DOCUMENTS 10,068,181 B1 9/2018 Rigetti et al.
2009/0173936 A1 7/2009 Bunyk
2010/0194466 A1 8/2010 Yorozu et al.
2014/0246763 A1 9/2014 Bunyk
2018/0013052 A1 1/2018 Oliver et al.
2019/0294991 A1 9/2019 Filipp et al.
2020/0152540 A1 5/2020 Nah et al.
2020/0210878 A1 * 7/2020 Sandberg ............ H10W 72/075
2020/0401924 A1 12/2020 Paik et al.
2021/0183793 A1 6/2021 Shao et al.
2021/0209498 A1 7/2021 Jin et al.
2021/0336118 A1 10/2021 Cantaloube
2021/0342729 A1 11/2021 Scheer et al.

(Continued)

FOREIGN PATENT DOCUMENTS

CN 111505479 A * 8/2020 ......... G01R 31/2896
CN 222639034 U * 3/2025

(Continued)

OTHER PUBLICATIONS

Japanese Office Action for JP Application No. 2022-131173 mailed on Jun. 2, 2026, with English Translation.

(Continued)

*Primary Examiner* — Suresh Memula
(74) *Attorney, Agent, or Firm* — Sughrue Mion, PLLC

(57) ABSTRACT

A quantum device includes a first quantum chip including a first qubit and a second qubit on a first surface of a first substrate; and a first via and a second via electrically connected to the first qubit and the second qubit penetrating the first substrate, and a second quantum chip including a coupling circuit, a coupling port coupling to the coupling circuit and a first pad for input and/or output of a signal for testing of the coupling circuit, on a first surface of a second substrate, the first pad disconnected from the coupling port, wherein the first qubit and the second qubit in electrical contact respectively via the first via and the second via with the coupling circuit arranged on the first surface of the second quantum chip.

16 Claims, 11 Drawing Sheets

(56) References Cited

U.S. PATENT DOCUMENTS

| | | | | |
|---|---|---|---|---|
| 2022/0036229 | A1 * | 2/2022 | Yamaji .................... | G06F 1/183 |
| 2022/0247407 | A1 | 8/2022 | Yamamoto et al. | |

FOREIGN PATENT DOCUMENTS

| | | | | | |
|---|---|---|---|---|---|
| CN | 121152350 | A | * | 12/2025 | ............. H10F 71/00 |
| EP | 4227693 | A1 | * | 8/2023 | ............ H10P 74/207 |
| EP | 4362651 | A1 | * | 5/2024 | ........... H10N 60/815 |
| JP | S58-145142 | A | | 8/1983 | |
| JP | 5093515 | B2 | | 12/2012 | |
| JP | 2021-504948 | A | | 2/2021 | |
| JP | 2021-106014 | A | | 7/2021 | |
| JP | 2021-516389 | A | | 7/2021 | |
| JP | 2022-504102 | A | | 1/2022 | |
| WO | 2012/133098 | A1 | | 10/2012 | |
| WO | 2021/014885 | A1 | | 1/2021 | |
| WO | 2022/008792 | A1 | | 1/2022 | |
| WO | WO-2025165388 | A2 | * | 8/2025 | ............. G06N 10/40 |

OTHER PUBLICATIONS

Shruti Puri, et. al., “Quantum annealing with all-to-all connected nonlinear oscillators”, Nature Communications vol. 8, 15785 (2017).

Wolfgang Lechner, et. al., “A quantum annealing architecture with all-to-all connectivity from local interactions”, Science Advances, Oct. 23, 2015 vol. 1, Issue 91, e1500838 (2015).

* cited by examiner

QUANTUM DEVICE AND CONFIGURATION METHOD THEREOF

CROSS REFERENCE TO RELATED APPLICATIONS

This application is based upon and claims the benefit of the priority of Japanese patent application No. 2022-131173, filed on Aug. 19, 2022, the disclosure of which is incorporated herein in its entirety by reference thereto. This disclosure relates to a quantum device and a configuration method thereof.

FIELD

Background

A quantum computer is a computer capable of hyper-parallel computation utilizing phenomena of quantum mechanics, such as superposition and quantum entanglement. In general, existing quantum computers can be categorized into two types: One is a gate-based quantum computer which is known to be able to solve certain problems, such as prime factorization and database searching, at a speed that is overwhelmingly faster than Neumann-type computers that are currently the mainstream. Another is an annealing-based quantum computer which is expected to solve a combinatorial optimization problem with high speed and accuracy.

A gate-based quantum computer often includes a network in which quantum bits (qubits) are coupled by the two-body interaction via a frequency tunable (or variable) coupler (e.g., Patent Literature (PTL) 1). As illustrated in FIG. 10, the quantum computer according to PTL 1 is provided with a plurality of (two) qubits (fixed frequency quantum circuits) 10A-1 and 10A-2, and a coupling circuit (a tunable coupler) 20A which is capacitively coupled to the qubits. The qubits 10A-1 and 10A-2 and coupling circuit 20A are formed on a same wiring layer. The coupling circuit (tunable coupler) 20A has a loop with Josephson junctions included. A frequency (resonance frequency) of the coupling circuit is modulated by changing a magnetic flux penetrating through the loop by changing a current flowing through a control line 30 inductively coupling with the loop. FIG. 10 is a diagram corresponding to FIG. 2 of PTL 1, while the reference numerals differ from those of FIG. 2 of PTL 1.

As an annealing-based quantum computer (that solves a combinatorial optimization problem by mapping the problem to an Ising model), an architecture that has a network in which Josephson Parametric Oscillators (JPOs) are coupled with each other by a four-body interaction is proposed (Non-Patent Literature (NPL) 1), in addition to a network based on the two-body interaction as in the gate scheme. A group of four JPOs (which is referred to as a plaquette in NPL 1) is a main building block of the architecture. By using the plaquette (square lattice), it is possible to scale up to a pyramid form needed to implement an LHZ (Lechner, Hauke, Zoller) scheme.

PTL 1: Japanese Patent Kokai Publication No. 2021-516389

NPL 1: Shruti Puri, et. al., "Quantum annealing with all-to-all connected nonlinear oscillators", Nature Communications Vol. 8, 15785 (2017)

NPL 2: Wolfgang Lechner, et. al., "A quantum annealing architecture with all-to-all connectivity from logical interactions", Science Advances, 23 Oct. 2015 Vol 1, Issue 91, e1500838 (2015)

SUMMARY

According to the related arts described above, as illustrated in FIG. 10, the qubits and the coupling circuit (coupler) are arranged in the same wiring layer. In general, it is difficult to route an input/output line and a control signal line dedicated for testing of a coupling circuit surrounded by a plurality of qubits in the same wiring layer. The difficulty becomes more apparent with an increase in a number of qubits interacting through the coupling circuit, such as the coupling circuit coupling four qubits by a four-body interaction.

In addition, it is desirable to have a configuration that facilitates unit testing of a coupling circuit (testing includes, for example, characteristic evaluation and/or operation confirmation) before the coupling circuit is operated as an element of a quantum computer, that is, before assembling of the coupling circuit into a quantum device. Similarly, it is desirable to facilitate unit testing of each of qubits before qubits are operated as elements of the quantum computer.

Therefore, it is an object of the present disclosure to provide a quantum device and a configuration method thereof, each enabling to facilitate testing of a coupling circuit that is configured to couple a plurality of qubits, before the coupling circuit is operated as an element of a quantum computer.

According to the present disclosure, a quantum device includes a first quantum chip and a second quantum chip stacked to each other.

The first quantum chip includes a first substrate, a first qubit and a second qubit both arranged on a first surface of the first substrate, and a first via and a second via electrically connected to the first qubit and the second qubit arranged on the first surface of the first substrate, respectively, the first via and the second via penetrating through the first substrate from the first surface of the first substrate to a second surface opposite to the first surface of the first substrate.

The second quantum chip includes a second substrate, a coupling circuit arranged on a first surface of the second substrate, a coupling port coupling to the coupling circuit, on the first surface of the second substrate, and a first pad for input and/or output of a signal for testing of the coupling circuit, on the first surface of the second substrate, the first pad disconnected from the coupling port. The first qubit and the second qubit arranged on the first surface of the first quantum chip are electrically connected respectively via the first via and the second via with the coupling circuit arranged on the first surface of the second quantum chip.

According to the present disclosure, there is provided a method of configuring a quantum device that includes a first quantum chip including a first qubit and a second qubit on a first surface of a first substrate and a second quantum chip including a coupling circuit to couple at least the first qubit and the second qubit, on a first surface of a second substrate. The method includes:

- arranging a first via and a second via in the first substrate, the first via and the second via electrically connecting to the first qubit and a second qubit, respectively, and penetrating through the first substrate of the first quantum chip from the first surface to a second surface opposite to the first surface of the first substrate;
- arranging a coupling port for testing of the coupling circuit and a first pad for input and/or output of a signal for testing of the coupling circuit;
- providing electrical connection between the first pad on the first surface of the second quantum chip and the coupling port to perform testing of the coupling circuit;

after the testing of the coupling circuit, removing electrical connection between the first pad and the coupling port on the first surface of the second quantum chip;

bonding the first quantum chip and the second quantum chip together, the first qubit and the second qubit of the first quantum chip connected to the coupling circuit of the second quantum chip via the first via and the second via in the first quantum chip bonded to the second quantum chip.

According to the present disclosure, it is possible to facilitate testing of a coupling circuit, which couples a plurality of qubits, before operating it as an element of a quantum computer, for example.

EXAMPLE EMBODIMENTS

Figure 1A:
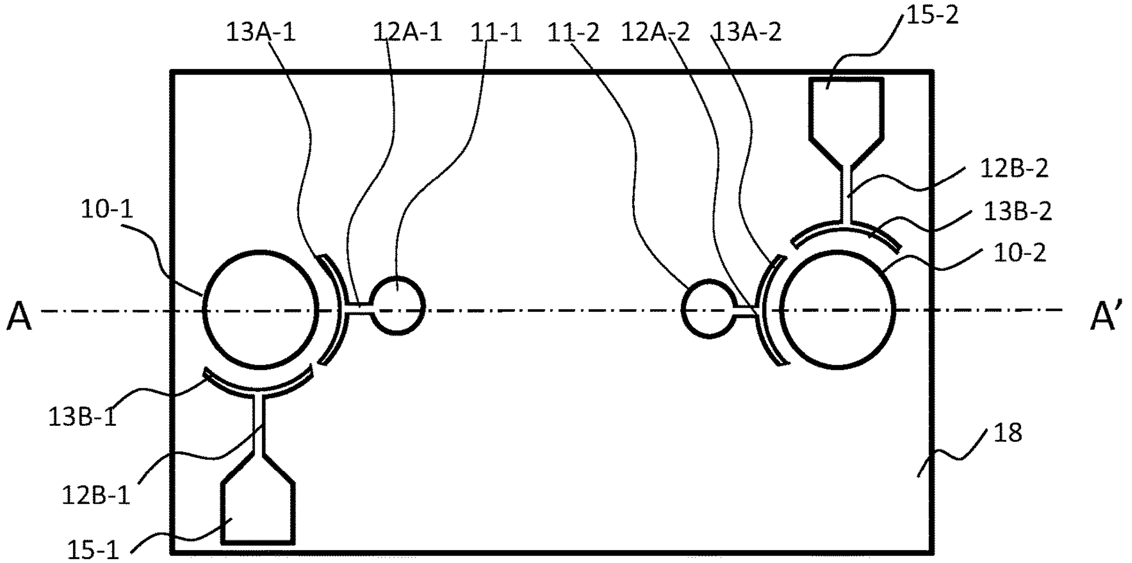
FIG. 1A is a schematic plan view (top plan view) illustrating a first quantum chip according to one example embodiment.
Figure 1B:
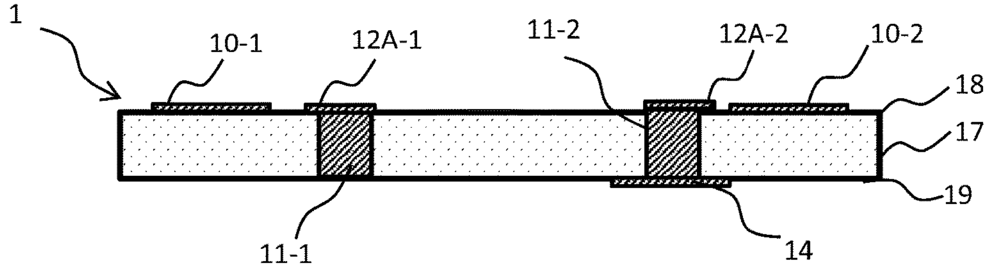
FIG. 1B is a schematic cross-sectional view illustrating the first quantum chip according to one example embodiment.
Figure 1C:
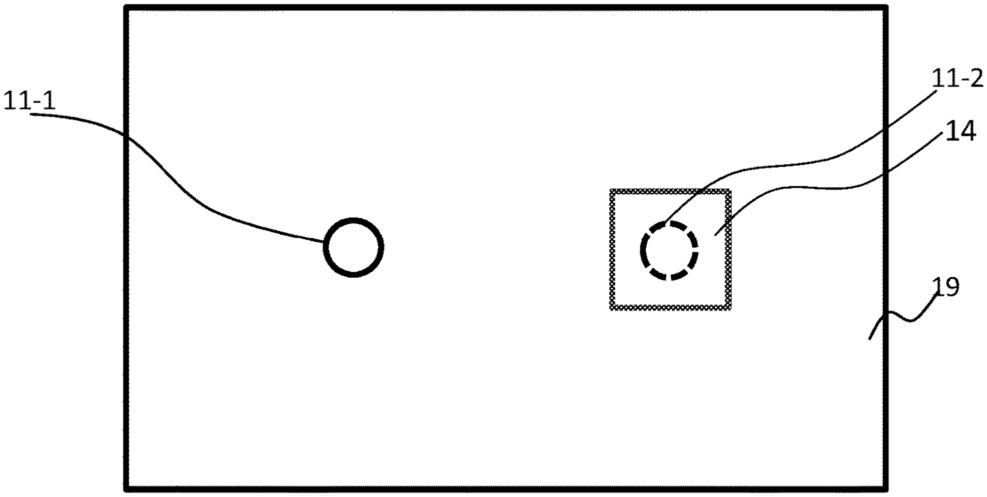
FIG. 1C is a schematic plan view (bottom plan view) illustrating the first quantum chip according to one example embodiment.

In the following description of examples, reference is made to the accompanying drawings in which it is shown by way of illustration specific examples that can be practiced. It is to be understood that other examples can be used and structural changes can be made without departing from the scope of the various examples. It is noted that in the present disclosure, the expression "at least one of A and B" means A, B, or (A and B). The term expressed as "--(s)" includes both singular and/or plural form. FIG. 1A to FIG. 1C illustrate one example embodiment. FIG. 1A is a schematic plan view of a first surface of a first semiconductor chip (referred to as "first quantum chip") having a plurality of qubits which are formed on a substrate by a semiconductor fabrication process technology. FIG. 1C is a schematic plan view of a second surface (opposite to the first surface) of the first quantum chip. FIG. 1B is a schematic cross-sectional view along line A-A' in FIG. 1A. In FIG. 1A, an example in which two quantum bits (qubits) are fabricated on the first quantum chip 1 is illustrated, for the sake of simplicity, but the number of qubits fabricated on the first quantum chip 1 is not limited to two. That is, the first quantum chip 1 may, as a matter of course, be configured with more than two qubits, for example, four qubits.

Referring to FIG. 1A, a first qubit 10-1 and a second qubit 10-2 are configured as superconducting qubits, respectively, which are fabricated using mainly a superconducting material on a first surface (front surface) 18 of a substrate (also called a "chip substrate") 17 (see FIG. 1B). Silicon (Si), for example, is used as the substrate 17, but electronic materials such as sapphire or compound semiconductor materials (Group IV, Group III-V and Group II-VI) may be used. The substrate 17 is preferably of a single crystal but may be polycrystalline or amorphous. A wiring pattern in FIG. 1A can be formed, for example, by deposition (vapor deposition) of a superconducting material on the first surface 18 of the substrate 17 and patterning the superconducting material. As a non-limiting example, the first qubit 10-1 and the second qubit 10-2 may be configured to include a Josephson parametric oscillator with a SQUID (superconducting quantum interference device) in which a plurality of Josephson junctions are arranged in a loop. The first qubit 10-1 and the second qubit 10-2 may be configured with, for example, a lumped element circuit. Alternatively, the first qubit 10-1 and the second qubit 10-2 may be configured with a distributed element circuit. In FIG. 1A, the first qubit 10-1 and the second qubit 10-2 are illustrated in a round shape for simplicity's sake, in which an electrode pattern and so on are omitted. A planar shape of the qubit may be arbitrary, such as a T-shape or a cross-shape, for example.

The first qubit 10-1 and the second qubit 10-2 connect respectively to one ends of transmission lines 12A-1 and 12A-2 via coupling ports 13A-1 and 13A-2 by capacitive or inductive coupling. The transmission lines 12A-1 and 12A-2 and the coupling ports 13A-1 and 13A-2 are mainly made of a superconducting material. The other ends of the transmission lines 12A-1 and 12A-2 are connected respectively to a first via 11-1 and a second via 11-2 on the first surface 18.

First and second pads (interconnect pads) 15-1 and 15-2 are mainly made of a superconducting material and are connected to the coupling ports 13B-1 and 13B-2 via the transmission lines 12B-1 and 12B-2, respectively.

In FIG. 1A, the first qubit 10-1 and the second qubit 10-2 are illustrated in a round shape, and the coupling ports 13A-1 and 13B-1 and the coupling ports 13A-2 and 13B-2 are each represented schematically as an arc for the sake of illustration. A shape of each of the coupling ports 13A-1 and 13B-1 and the coupling ports 13A-2 and 13B-2 is as a matter of course not limited to the arc.

Signals supplied to the first pad 15-1 and the second pad 15-2 from external signal sources (not shown) may be transmitted via the transmission lines 12B-1 and 12B-2, respectively, to the coupling ports 13B-1 and 13B-2, and applied therefrom, by inductive or capacitive coupling, to the first qubit 10-1 and the second qubit 10-2, respectively. Alternatively, signals (readout signals) from the first qubit 10-1 and the second qubit 10-2 are via the coupling ports 13B-1 and 13B-2 by inductive or capacitive coupling transmitted to the transmission lines 12B-1 and 12B-2, respectively, and transmitted from the first and second pads 15-1 and 15-2 to external readout circuits (not shown), respectively. In FIG. 1A, a set of the first pad 15-1, the transmission line 12B-1, and the coupling port 13B-1 constitutes an IO path (an IO pad, an IO line, and an IO port), but an input path for a signal applied to the first qubit 10-1 and an output path for a signal from the first qubit 10-1 (readout signal) may be provided separately. It may also be similarly configured for the second qubit 10-2. When each of the first qubit 10-1 and the second qubit 10-2 includes, for example, a Josephson Parametric Oscillator (JPO), the first quantum chip 1 may be configured to be further provided with a signal path (a pad, a transmission line, a coupling port) supplying a microwave signal to each of the first qubit 10-1 and the second qubit 10-2.

In the first quantum chip 1, as a superconducting material (wiring material), Nb (niobium) or Al (aluminum) may be used, for example, though not limited thereto. Any metal that becomes superconductive at a cryogenic temperature may be used, such as niobium nitride, indium (In), lead (Pb), tin (Sn), rhenium (Re), palladium (Pd), titanium (Ti), titanium nitrides, molybdenum (Mo), tantalum (Ta), tantalum nitride, and an alloy containing at least one of the above metals. The first qubit 10-1 and the second qubit 10-2 may include Josephson junctions. Josephson junctions (Al/AlOx/Al) may be formed by forming a first aluminum film on the first surface 18 of the substrate 17 by oblique deposition, oxidizing the first aluminum film to form a tunnel oxide film (AlOx), and forming a second aluminum film by oblique deposition from a direction opposite to a direction when the first aluminum film was formed.

The first via 11-1 and the second via 11-2 are through vias provided with vertical holes penetrating through the substrate 17 from the first surface 18 to the second surface 19. As illustrated in FIG. 1B, the first via 11-1 and the second via 11-2 may be a filled via with a conductive material (mainly a superconducting material is used) filled insides the via hole. Alternatively, the first via 11-1 and the second via 11-2 may be a conformal via with a conductive material (mainly a superconducting material is used) formed with a constant thickness along a shape of the via hole. When the substrate 17 is made of silicon, the first via 11-1 and the second via 11-2 are also called through silicon via (TSV). In this case, as a non-limiting example, the first via 11-1 and the second via 11-2 may be formed in a wafer process, for example, after a wiring process on the first surface 18 of the substrate 17 (via last). In the via last, etching or laser beam may be used for drilling a via hole in a silicon substrate, and a conductive material may be plated into the via hole. Alternatively, via holes (through holes) may be drilled in the substrate 17 first, and then a wiring pattern may be formed on the first surface 18 of the substrate 17.

As illustrated in FIG. 1C, at a portion where the second via 11-2 contacts the second surface 19 of the first quantum chip 1 (opening edge), a pad (via pad) 14 may be formed to have a flat portion that is in contact with and covers an end surface of the second via 11-2. The pad 14 may be mainly made of a superconducting material. With this structure, signals can be transmitted from the first qubit 10-1 and the second qubit 10-2 to the second surface 19 of the substrate 17 through the coupling ports 13A-1 and 13A-2 and the first via 11-1 and the second via 11-2, respectively, while maintaining coherence (i.e., while maintaining a phase of a high-frequency current).

As a non-limiting example, in FIG. 1A, the transmission lines 12A-1, 12A-2, 12B-1, and 12B-2 may be a coplanar waveguide in which both sides of a longitudinal direction of a signal line are surrounded via gaps by ground planes (ground patterns), not shown. The first via 11-1 and the second via 11-2 may be configured to be surrounded via a gap by a ground plane (ground pattern), not shown, around thereof, except at portions connected to the transmission lines 12A-1 and 12B-1, for example. The first qubit 10-1 and the second qubit 10-2 may also be configured to be surrounded via a gap by a ground plane (ground pattern), not shown, around thereof, except at portions opposed to the coupling ports 13A-1 and 13B-1 and the coupling ports 13A-2 and 13B-2, respectively.

Figure 2A:
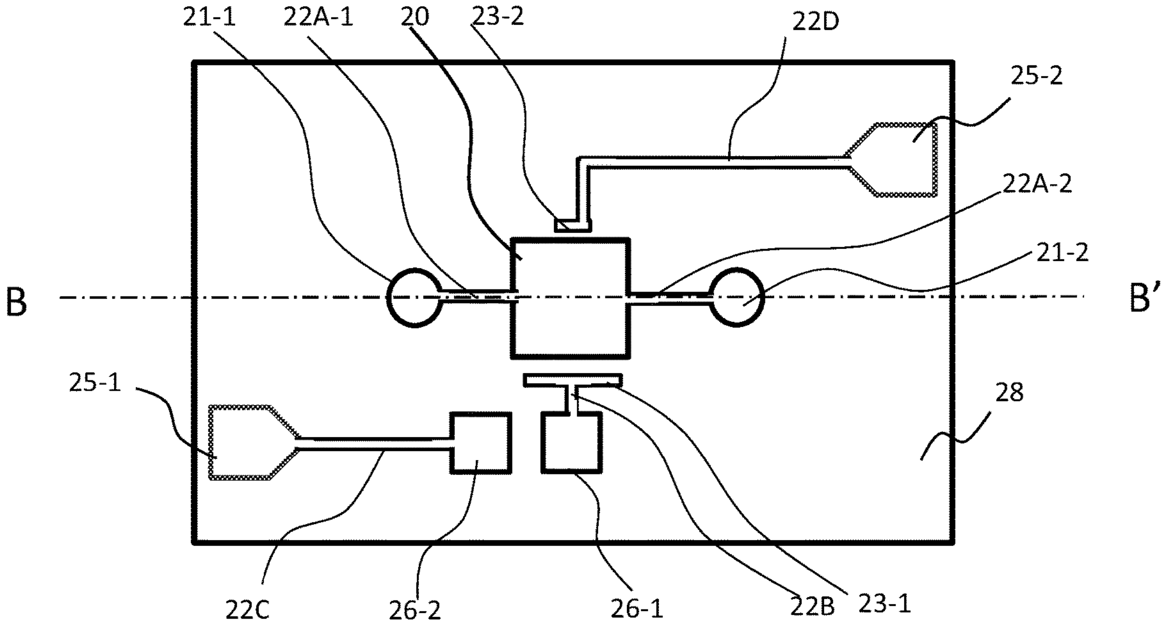
FIG. 2A is a schematic plan view (top plan view) illustrating a second quantum chip according to one example embodiment.
Figure 2B:
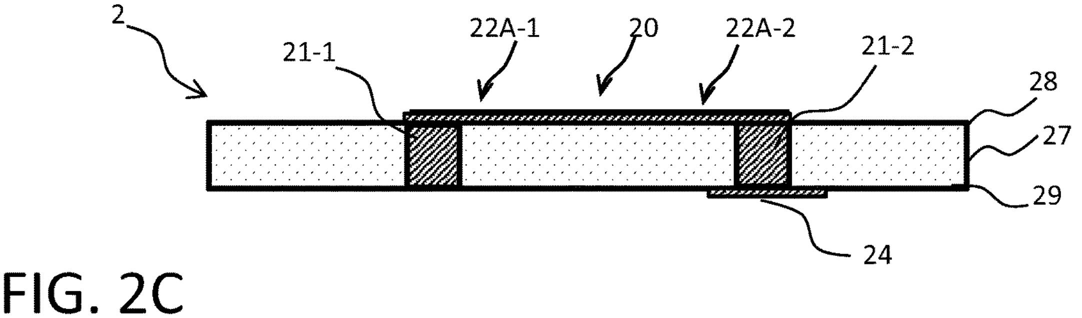
FIG. 2B is a schematic cross-sectional view illustrating the second quantum chip according to one example embodiment.
Figure 2C:
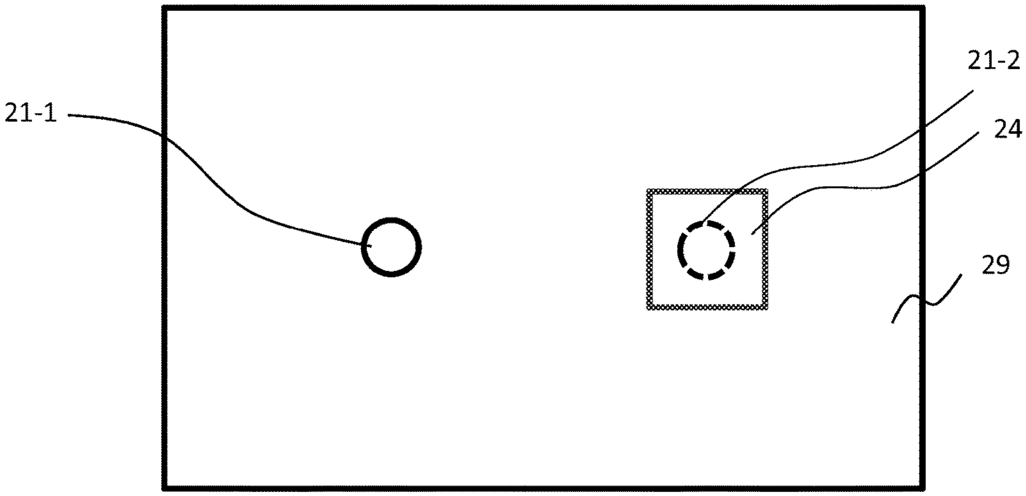
FIG. 2C is a schematic plan view (bottom plan view) illustrating the second quantum chip according to one example embodiment.

FIG. 2A to FIG. 2C schematically illustrate a second quantum chip 2, which is provided with a coupling circuit 20 formed on a substrate using a semiconductor micro-fabrication process technology. FIG. 2A is a schematic plan view illustrating a first surface (front surface) of the second quantum chip 2. FIG. 2C is a schematic plan view illustrating a second surface (rear surface) of the second quantum chip 2. FIG. 2B is a schematic cross-sectional view along line B-B' in FIG. 2A.

Referring to FIG. 2A, the coupling circuit 20 coupling the first qubit 10-1 and the second qubit 10-2 is formed on a first surface 28 of a substrate 27 (see FIG. 2B) of the second quantum chip 2. The coupling circuit 20 is mainly made of a superconducting material. The substrate (also called "chip substrate") 27 of the second quantum chip 2 is preferably made of the same material as the substrate 17 of the first quantum chip 1 described above, taking into account, for example, a shrinkage (linear shrinkage rate) of the substrate when cooled to a cryogenic temperature. A wiring pattern in FIG. 2A can be formed, for example, by deposition (vapor deposition) of a superconducting material on the first surface 28 of the substrate 27 and patterning of the superconducting material. As the superconducting material, a material preferably the same as the superconducting material of the first quantum chip 1 described above is used. For simplicity, the coupling circuit 20 is represented schematically as a rectangle (square) in FIG. 2A without illustrating a wiring pattern (an electrode), but a shape of the coupling circuit 20 is of course not limited to a square. As a non-limiting example, the coupling circuit 20 may be configured to include a circuit including one Josephson junction, or may be configured to include a SQUID and/or a RING Modulator (see NPL 1), etc.

The coupling circuit 20 connects to a first via 21-1 and a second via 21-2, respectively, via transmission lines 22A-1 and 22A-2, which are mainly made of a superconducting material.

As illustrated in FIG. 2B, the first via 21-1 and the second via 21-2 function as transmission lines of a superconductor, which penetrate through the substrate 27 from the first surface 28 to the second surface 29 of the second quantum chip 2. The first via 21-1 and the second via 21-2 are through vias provided with vertical holes penetrating through the substrate 27 from the first surface 28 to the second surface 29. As illustrated in FIG. 2B, they may be filled vias with via holes filled with a conductive material (mainly a superconducting material is used). Alternatively, they may be conformal vias, with a conductive material (mainly a superconducting material is used) formed with a constant thickness along shapes of the via holes. When the substrate 27 of the second quantum chip 2 is made of silicon, the first via 21-1 and the second via 21-2 are also called through silicon via (TSV). In this case, the first via 21-1 and the second via 21-2 may be formed after the wiring process on the first surface 28 of the substrate 27. Alternatively, via holes (through holes) may be drilled in the substrate 27 first, and then a wiring pattern may be formed on the first surface 28 of the substrate 27. The conductive material (mainly superconducting material) of the first via 21-1 and the second via 21-2 may be the same as the conductive material of the first via 11-1 and the second via 11-2 of the first quantum chip 1 described above.

As illustrated in FIG. 2B and FIG. 2C, a pad 24 is provided at a portion where the second via 21-2 contacts the second surface 29 of the second quantum chip 2. The pad 24 has a flat portion that is in contact with and covers an end surface of the second via 21-2 on the second surface 29. The pad 24 may be mainly made of a superconducting material.

Referring again to FIG. 2A, a first pad 25-1 and a second pad 25-2 are pads (bonding pads) that are electrically connected (wire-bonded) to a printed circuit board (PCB; not shown), using bonding wires, in a test setup for testing the coupling circuit 20 which will later be described. The first pad 25-1 and the second pad 25-2 may be mainly made of a superconducting material. The first pad 25-1 may be a pad for input/output of a signal for testing (characteristic evaluation and/or operation confirmation, etc.) the coupling circuit 20. The second pad 25-2 may be a pad for input of a control signal to the coupling circuit 20.

26-1 and 26-2 are pads that are to be electrically connected (wire-bonded) by bonding wires (not shown) in the test setup for testing the coupling circuit 20. Pads 26-1 and 26-2 may be mainly made of a superconducting material. A transmission line 22C, which is mainly made of a superconducting material, connects the first pad 25-1 and the pad 26-2. A transmission line 22B, which is mainly made of a superconducting material, connects the pad 26-1 and a coupling port 23-1. The coupling port 23-1, which is mainly made of a superconducting material, is inductively or capacitively coupled to the coupling circuit 20. When testing the coupling circuit 20, the pad 26-2 and the pad 26-1 are connected by a bonding wire (not shown) to configure the transmission line 22C, the pad 26-2, the pad 26-1, and the transmission line 22B, as a connection path to connect electrically the first pad 25-1 and the coupling port 23-1. Except during testing, the pad 26-2 and the pad 26-1 are kept in a disconnected state, and the transmission lines between the first pad 25-1 and the coupling port 23-1 are in an electrically disconnected state.

A gap between the pad 26-1 and the pad 26-2 may be set so that a high-frequency signal (an electromagnetic wave signal) from the coupling circuit 20 is not transmitted from the coupling port 23-1 to the transmission line 22C to prevent leakage of the signal to the transmission line 22C side by capacitive coupling between the pad 26-1 and the pad 26-2. Alternatively, a ground pattern (not shown) may be arranged between the pad 26-1 and the pad 26-2 to reduce capacitive coupling between the pad 26-1 and the pad 26-2.

A transmission line 22D, which is mainly made of a superconducting material, connects the second pad 25-2 and a coupling port 23-2. The coupling port 23-2, which is mainly made of a superconducting material, transmits a control signal, which is transmitted on the transmission line 22D from the second pad 25-2, to the coupling circuit 20 by inductive coupling or capacitive coupling. A path configured with the second pad 25-2, the transmission line 22D, and the coupling port 23-2 may be used for supply of a control signal to the coupling circuit 20 when the coupling circuit 20 is operated as an element of a quantum computer (i.e., other than during testing the coupling circuit 20).

As a non-limiting example, the transmission lines 22A-1, 22A-2, 22B, 22C, and 22D may be a coplanar waveguide in which both sides of a longitudinal direction of a signal line are configured to be surrounded via gaps by ground planes (ground patterns), not shown. The coupling circuit 20 may be configured to be surrounded via a gap by a ground plane (ground pattern), not shown, around thereof, except at portions connected to the second vias 21-1 and 21-2 and opposed to the coupling ports 23-1 and 23-2.

Figure 3:
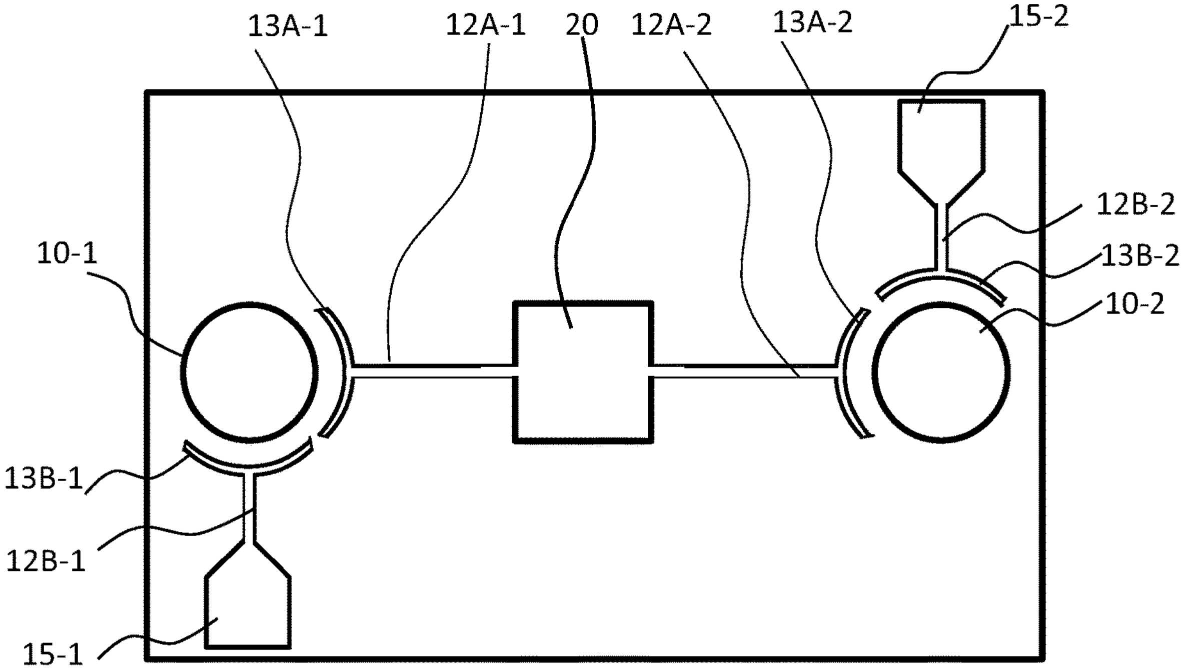
FIG. 3 is a schematic plan view illustrating a reference example in which a quantum device is configured with a single quantum chip.
Figure 10:
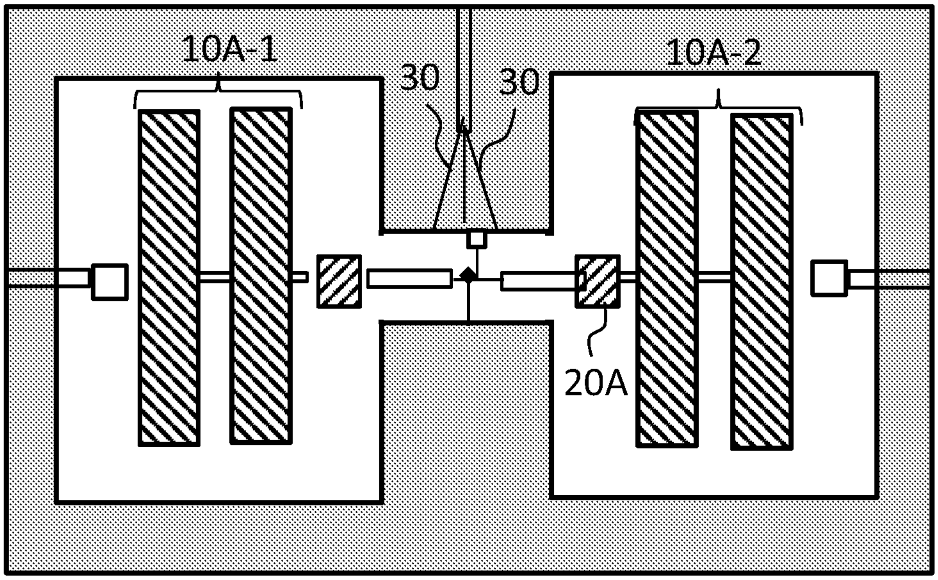
FIG. 10 is a schematic plan view illustrating a related art.

FIG. 3 is a schematic plan view illustrating a quantum device (reference example) having a configuration in which the first qubit 10-1, the second qubit 10-2 and the coupling circuit 20, which are described with reference to FIG. 1 and FIG. 2, are provided on one (same) wiring layer of one semiconductor chip (a quantum chip). In FIG. 3, shapes of qubits, coupling circuits and coupling ports are the same as those in FIG. 1 and FIG. 2. FIG. 3 is also a reference diagram to clarify a correspondence between elements of each chip when a quantum device of a single chip is divided into the first quantum chip 1 in FIG. 1 and the second quantum chip 2 in FIG. 2, and elements of the single chip before being divided. Coupling ports 13B-1 and 13B-2, which are connected to first and second pads 15-1 and 15-2 via transmission lines 12B-1 and 12B-2, respectively, are inductively coupled or capacitively coupled to the first qubit 10-1 and the second qubit 10-2, respectively. Note that wiring patterns (e.g., wiring patterns of the second pad 25-2, the transmission line 22D, and the coupling port 23-2 in FIG. 2A, or the control line 30 in FIG. 10) that apply control signals to the coupling circuit 20 are not illustrated in FIG. 3.

As explained with reference to FIG. 1A to FIG. 2C, the first qubit 10-1 and the second qubit 10-2 are fabricated in the first quantum chip 1 and the coupling circuit 20, which couples the first qubit 10-1 and the second qubit 10-2 by, for example, two body interaction, is fabricated in the second quantum chip 2. This enables to perform testing of the first quantum chip 1 and the second quantum chip 2 (e.g., to perform characteristic evaluation and/or operation confirmation of a circuit) independently.

Figure 4:
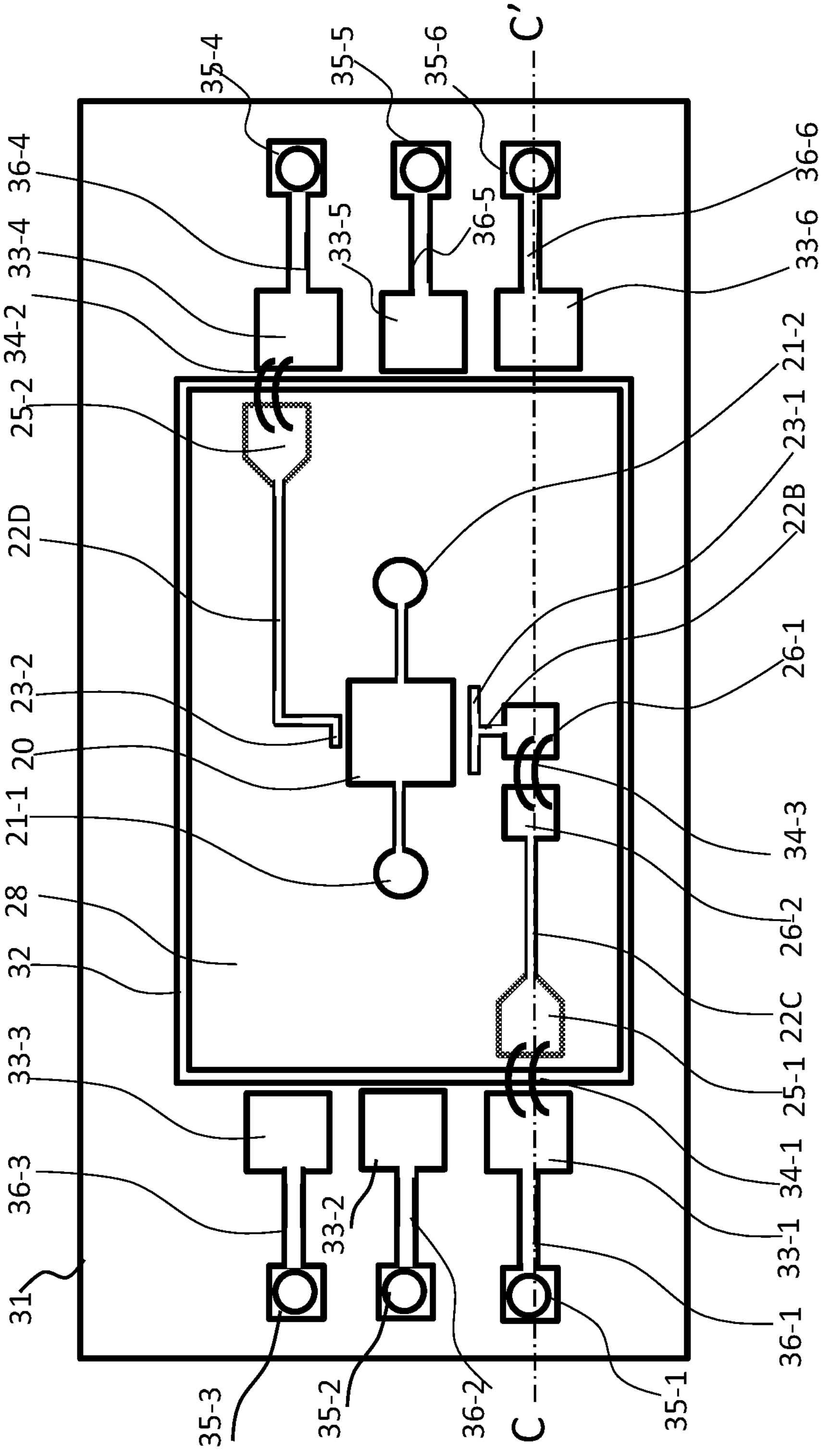
FIG. 4 is a schematic plan view illustrating an example of a test setup according to one example embodiment.

FIG. 4 is a schematic plan view illustrating an example of a test setup of the coupling circuit 20 of the second quantum chip 2 in FIG. 2A. The first surface 28 of the second quantum chip 2 and a plane of a printed circuit board 31 that houses the second quantum chip 2 are illustrated schematically in FIG. 4. In the schematic plan view in FIG. 4, a size of the second quantum chip 2 is set relatively large for illustration's sake, as compared with a size of the printed circuit board 3. The size of the printed circuit board 31 is of course not limited to the example illustrated in FIG. 4.

In the example in FIG. 4, testing (e.g., characteristic evaluation and operation confirmation, etc.) of the coupling circuit 20 of the second quantum chip 2 is performed using the printed circuit board 31 that is connected to a measurement apparatus (not shown). As described with reference to FIG. 2A, there are provided, in addition to the coupling circuit 20, the first via 21-1 and the second via 21-2, on the first surface 28 of the second quantum chip 2, the coupling port 23-1, the pad 26-1 connected to the coupling port 23-1 via the transmission line 22B, and the pad 26-2 located close to the pad 26-1, and the first pad 25-1 (I/O pad) connected to the pad 26-2 via the transmission line 22C, as a line (wiring pattern) for input and output of a signal for testing to the coupling circuit 20. There is provide the second pad 25-2 (control pad) connected to the coupling port 23-2 via the transmission line 22D as a line (wiring pattern) for applying a control signal to the coupling circuit 20.

In the example illustrated in FIG. 4, there is provided an opening 32 around a center of the printed circuit board 31 to house the second quantum chip 2 with its first surface 28 up. A planar shape of the opening 32 of the printed circuit board 31 is a rectangle corresponding to the planer shape of the second quantum chip 2. Along two opposite sides of the opening 32 of the printed circuit board 31, bonding pads 33-1 to 33-3 and 33-4 to 33-6 for wire bonding with the first pad 25-1 and the second pad 25-2 on the first surface 28 of the second quantum chip 2 are arranged in alignment at a preset pitch, respectively. Bonding pads may be arranged opposing to each other not only along each of left and right sides of the opening 32, but also along each of top and bottom sides thereof on the printed circuit board 31. As a non-limiting example, if a size of the second quantum chip 2 is in the order of millimeters (mm) in both length and width and the printed circuit board 31 is in the order of centimeters (cm) in both length and width, a wiring pitch of the second quantum chip 2 fabricated using a semiconductor fabrication process technology is different from that of the printed circuit board 31. For this reason, if a plurality of pads 25 are aligned on the first surface 28 of the second quantum chip 2, pitch conversion may be performed on the printed circuit board 31 side.

Figure 5A:
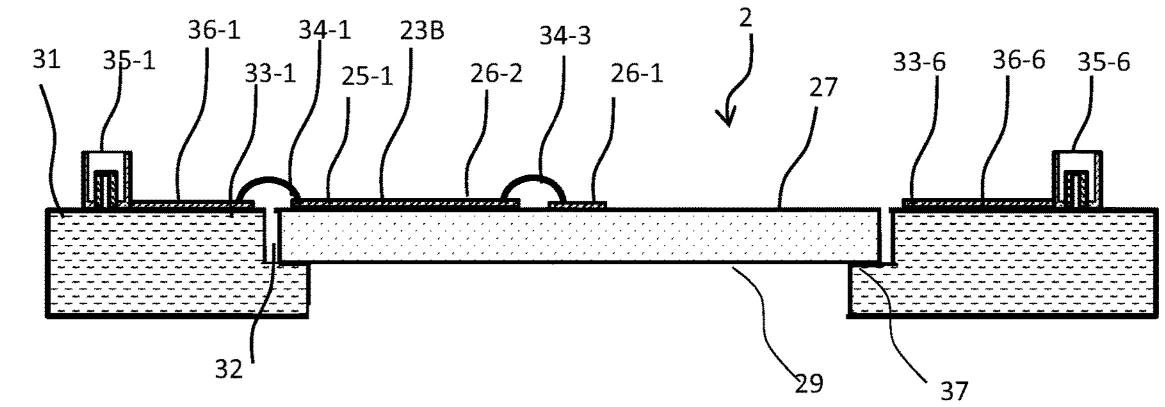
FIG. 5A is a schematic cross-sectional view illustrating the test setup illustrated in FIG. 4.
Figure 5B:
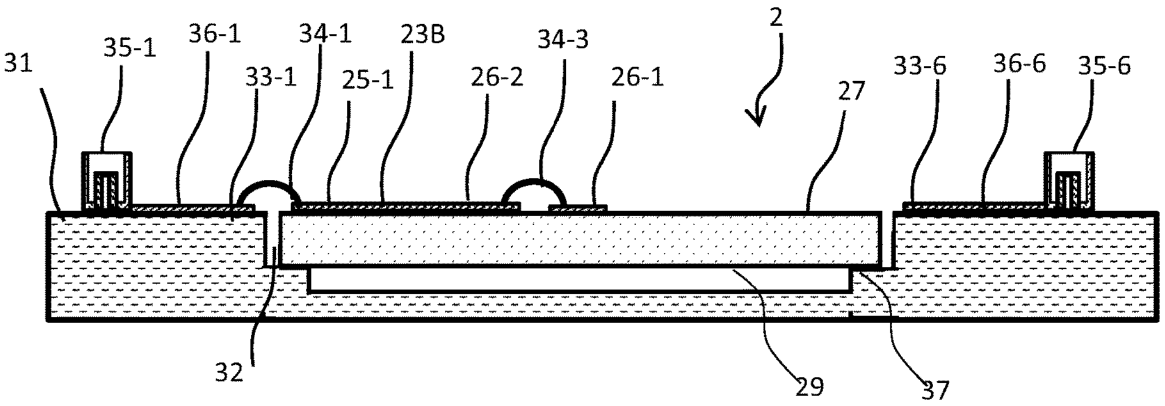
FIG. 5B is a schematic cross-sectional view illustrating the test setup illustrated in FIG. 4.
Figure 5C:
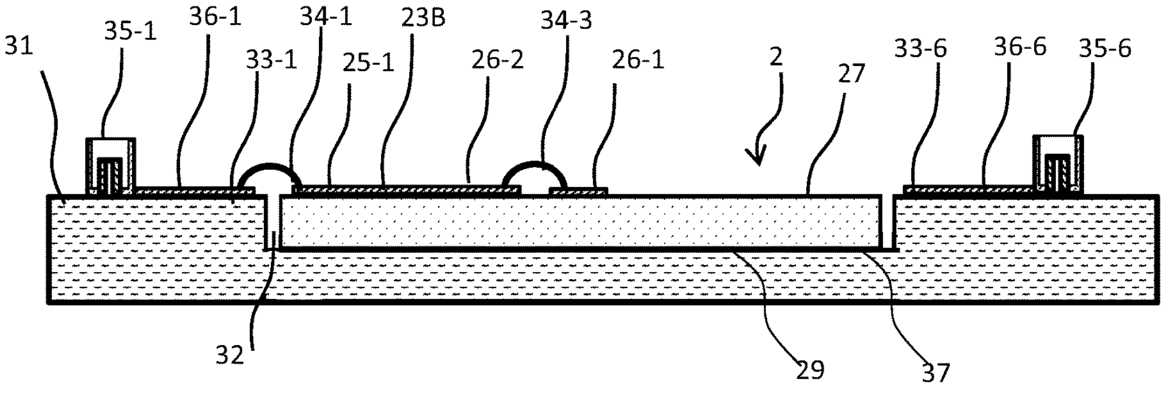
FIG. 5C is a schematic cross-sectional view illustrating the test setup illustrated in FIG. 4.

The second quantum chip 2 is housed in the opening 32 of the printed circuit board 31, with the second surface 29 down. FIG. 5A schematically illustrates a cross-sectional view along line C-C' in FIG. 4. In the example illustrated in FIG. 5A, the opening 32 of the printed circuit board 31 is provided with a support portion 37 that in contact with an outer edge of the second surface 29 of the second quantum chip 2. When the second quantum chip 2 is housed in the opening 32 of the printed circuit board 31, a height of the first pad 25-1 on the first surface 28 of the second quantum chip 2 and a height of the bonding pad 33-1 of the printed circuit board 31 may be the same. In this state, the first pad 25-1 and the second pad 25-2 of the second quantum chip 2 are connected to the bonding pads 33-1 and 33-4 of the printed circuit board 31 by bonding wires 34-1 and 34-2, respectively (see FIG. 4). The opening (cutout) 32 of the printed circuit board 31 may be an opening that penetrates from a front surface to a rear surface of the printed circuit board 31. In the example illustrated in FIG. 5A, the printed circuit board 31 may be placed on a pedestal (holder), not shown. In the example illustrated in FIG. 5B, the opening 32 of the printed circuit board 31 is a bottomed opening with a void under the second surface 29 of the second quantum chip 2. In the example illustrated in FIG. 5C, the opening 32 of the printed circuit board 31 is a bottomed opening whose depth is the same as a height of the second quantum chip 2. In this case, a whole bottom surface of the opening 32 of the printed circuit board 31 becomes the support portion 37 of the second surface 29 of the substrate 27 of the second quantum chip 2. In FIG. 5A to FIG. 5C, heights of the second quantum chip 2 and the printed circuit board 31 are illustrated schematically. This is because it is difficult to represent the elements of the second quantum chip 2 as a drawing when, for example, a thickness of the second quantum chip 2 is in the order of 10 to 100 μm and a board thickness of the printed circuit board 31 is in the order of mm (about 1.6 mm, for example).

Referring to FIG. 4, when testing the coupling circuit 20 on the first surface 28 of the second quantum chip 2, the first pad (input/output pad) 25-1 on the first surface 28 of the second quantum chip 2 and the bonding pad 33-1 of the printed circuit board 31 are connected by the bonding wire 34-1, and the second pad (control pad) 25-2 on the first surface 28 of the second quantum chip 2 and the bonding pad 33-4 of the printed circuit board 31 are connected by the bonding wire 34-2. The pad 26-1 and the pad 26-2 on the first surface 28 of the second quantum chip 2 are connected by a bonding wire 34-3. As a non-limiting example, the bonding wires 34-1 to 34-3 are made of superconducting material such as Al. In FIG. 4, there is illustrated an example of a plurality of (two) bonding wires connected in parallel as bonding wires for connection between pads, for example, from a viewpoint of connection reliability, etc. The number of bonding wires for connection between pads may as a matter of course be one.

The bonding pads 33-1 to 33-3 and 33-4 to 33-6 are connected to the connectors 35-1 to 35-3 and 35-4 to 35-6 by the transmission lines 36-1 to 36-3 and 36-4 to 36-6, respectively. The connector may be preferably high-frequency coaxial connector and connected to a measurement apparatus (measurement electronics), not shown, for input/output or control through a high-frequency cable (coaxial cable) not shown. In FIG. 4, the connectors 35-1 to 35-3 and 35-4 to 35-6 are arranged at the same pitch as the bonding pads 33-1 to 33-3 and 33-4 to 33-6, but of course they are not limited to this configuration. The bonding pads 33-1 to 33-3, and 33-4 to 33-6, and the transmission lines 36-1 to 36-3, and 36-4 to 36-6 may be made of a normal-conducting material (for example, aluminum alloys), including copper. The measurement apparatus (network analyzer or spectrum analyzer), not shown, supplies a signal to the first pad 25-1 of the second quantum chip 2 though the connector 35-1, the transmission line 36-1, and the bonding pad 33-1 of the printed circuit board 31, and to the coupling circuit 20 through the coupling port 23-1 therefrom to perform high-frequency characteristic evaluation (S-parameter measurement) and measurement of a resonance frequency of the coupling circuit 20 (operation confirmation). The measurement apparatus may control the resonance frequency of the coupling circuit 20 by means of a control signal (DC signal or microwave) applied to the coupling circuit 20 from the second pad (control pad) 25-2. The measurement apparatus is installed at a room temperature outside a dilution refrigerator, not shown.

According to the present example embodiment, the above described test setup enables to perform testing (characteristic evaluation and operation confirmation) of the coupling circuit 20 fabricated on the second quantum chip 2 before the second quantum chip 2 is assembled into a quantum device, i.e., before the second quantum chip 2 is operated as an element of a quantum computer. Testing of the second quantum chip 2 may be performed in a state cooled to a cryogenic temperature in a dilution refrigerator, not shown.

In FIG. 4, an example of using a printed circuit board 31 to evaluate the characteristics of the second quantum chip 2 is illustrated. A probe (high-frequency probe) can be used for testing which is arranged in a high-frequency test fixture or a probe card, not shown. In this case, a high-frequency signal generated by a measurement apparatus (not shown) may be supplied through a high-frequency cable (not shown) to a high-frequency probe (not shown), from which a high-frequency signal is applied to the first pad 25-1 on the first surface 28 of the substrate 27 of the second quantum chip 2, and a signal from the first pad 25-1 may be received at the high-frequency probe (not shown) and supplied through the high-frequency cable (not shown) to the measurement apparatus (not shown). A control signal may be applied from a probe (not shown) to the second pad 25-2 on the first surface 28 of the substrate 27 of the second quantum chip 2.

For the first quantum chip 1, as with the second quantum chip 2, by preparing a printed circuit board and/or a high-frequency probe, it is possible to perform testing of the qubits (e.g., characteristic evaluation and/or operation confirmation) before operating the qubits as quantum computer elements.

Figure 6A:
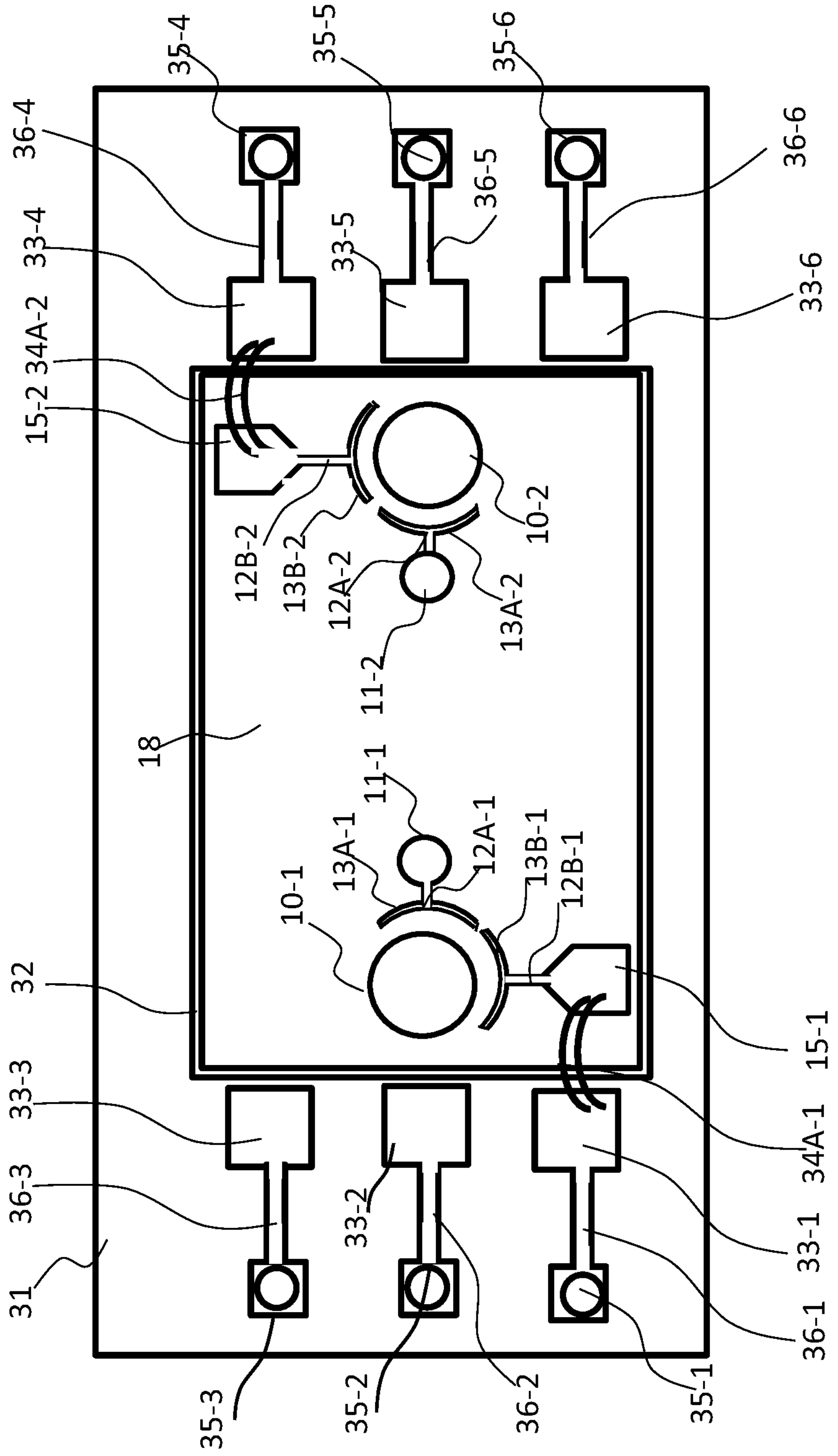
FIG. 6A is a schematic plan view illustrating an other example of a test setup according to one example embodiment.

FIG. 6A is a schematic plan view illustrating an example of a test setup for testing the first qubit 10-1 and the second qubit 10-2 of the first quantum chip 1 described with reference to FIG. 1 using a printed circuit board. In FIG. 6A, a configuration of the first surface 18 of the first quantum chip 1 and a printed circuit board 31 that houses the first quantum chip 1. In FIG. 6A, for simplicity of explanation, the printed circuit board is the printed circuit board 31 described with reference to FIG. 4. The printed circuit board for testing the first quantum chip 1 may be as a matter of course prepared separately and is not limited to the printed circuit board 31 illustrated in FIG. 4. The first quantum chip 1 is housed in the opening 32 of the printed circuit board 31, with its second surface 19 facing down, as is the second quantum chip 2 described above.

Referring to FIG. 6A, the first and second pads 15-1 and 15-2 of the first quantum chip 1 are connected to the bonding pads 33-1 and 33-4 of the printed circuit board 31 by bonding wires 34A-1 and 34A-2, respectively. When performing testing of the first qubit 10-1 (characteristic evaluation, operation confirmation, etc.), a signal from a measurement apparatus (not shown) is transmitted to the first pad 15-1 of the first quantum chip 1, via the connector 35-1, the transmission line 36-1, and the bonding pad 33-1 of the printed circuit board 31 and the bonding wire 34A-1, and then supplied from the first pad 15-1 to the first qubit 10-1 via the transmission line 12B-1 and the coupling port 13B-1. A signal from the first qubit 10-1 to the first pad 15-1 via the coupling port 13B-1 and the transmission line 12B-1 and may be transmitted to the connector 35-1 via the bonding wire 34A-1 and the bonding pad 33-1 of the printed circuit board 31 and transmitted from the connector 35-1 to the measurement apparatus (not shown) for measurement. In a transmission line between the connector 35-1 and the measurement apparatus (not shown), switching of a signal between input and output is performed by, for example, a circulator. Similarly, when performing testing of the second qubit 10-2 (characteristic evaluation, operation confirmation, etc.), a signal from a measurement apparatus (not shown) is transmitted to the second pad 15-2 of the first quantum chip 1 via the connector 35-4, the transmission line 36-4, and the bonding pad 33-4 of the printed circuit board 31 and the bonding wire 34A-2, and then supplied from the second pad 15-2 to the second qubit 10-2 via the transmission line 12B-2 and the coupling port 13B-2. A signal from the second qubit 10-2 is transmitted to the second pad 15-2 via the coupling port 13B-2 and the transmission line 12B-2, transmitted from the second pad 15-2 via the bonding wire 34A-2 and the bonding pad 33-4 of the printed circuit board 31 to the connector 35-4 and transmitted from the connector 35-4 to the measurement apparatus (not shown) for measurement. When a test result confirms that no fail is detected in both first qubit 10-1 and the second qubit 10-2, and the first quantum chip 1 is a good product, the bonding wires 34A-1 and 34A-2 are removed from the first quantum chip 1.

Figure 6B:
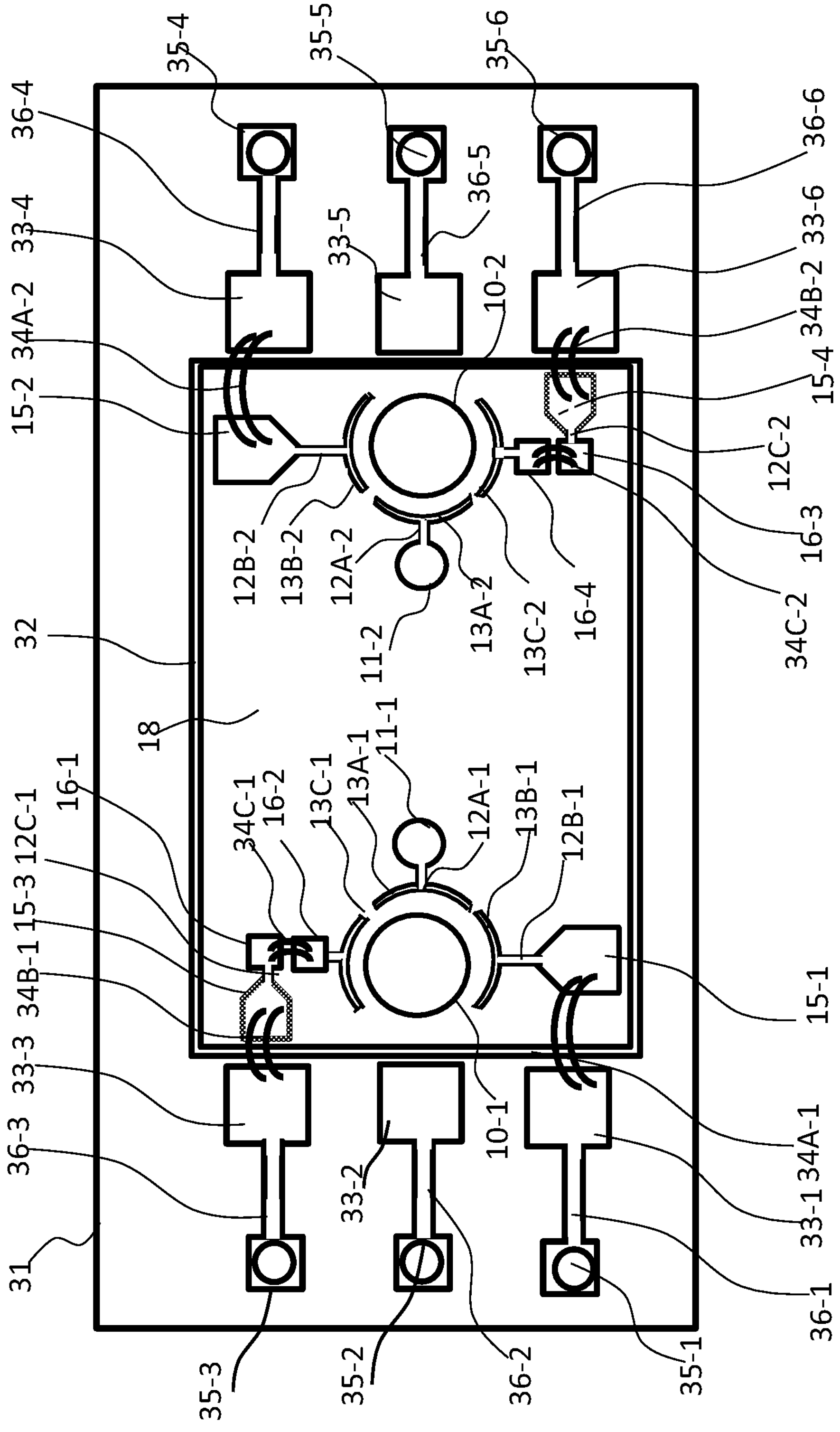
FIG. 6B is a schematic plan view illustrating a variation example of a test setup according to one example embodiment.

FIG. 6B is a schematic plan view illustrating an example of a test setup for testing the first quantum chip 1, which has a configuration to be further provided with a set of a coupling port for testing, a pad for testing, and a line connecting them for each of the first quantum chip 1 and the second quantum chip 2, using a printed circuit board 31 as in illustrated FIG. 6A. Referring to FIG. 6B, the first surface 18 of the first quantum chip 1 is provided with a third pad 15-3 and a fourth pad 15-4 which are connected through a coupling port 13C-1 and a coupling port 13C-2 to the first qubit 10-1 and the second qubit 10-2, respectively, in addition to the configuration illustrated in FIG. 6A, first qubit 10-1. When testing the first qubit 10-1 and the second qubit 10-2, the first, second third and fourth pads 15-1, 15-2, 15-3, and 15-4 are connected to the bonding pads 33-1, 33-4, 33-3, and 33-6 of the printed circuit board 31 by bonding wires 34A-1, 34A-2, 34B-1, and 34B-2, respectively. Furthermore, pads 16-1 and 16-3, which are connected to the third and fourth pads 15-3 and 15-4 through transmission lines 12C-1 and 12C-2, respectively, and pads 16-2 and 16-4, which are connected to coupling ports 13C-1 and 13C-2, respectively, are connected by bonding wires 34C-1 and 34C-2, respectively. The third and fourth pads 15-3 and 15-4, the transmission lines 12C-1 and 12C-2, the pads 16-1 to 16-4, and the coupling ports 13C-1 and 13C-2 are mainly made of a superconducting material.

When performing testing of the first qubit 10-1, a signal from a measurement apparatus (not shown) is transmitted to the first pad 15-1 of the first quantum chip 1 via the connector 35-1, the transmission line 36-1, and the bonding pad 33-1 of the printed circuit board 31 and the bonding wire 34A-1, and supplied from the first pad 15-1 to the first qubit 10-1 via the transmission line 12B-1 and the coupling port 13B-1. The state of the first qubit 10-1 at this time may be obtained by measuring a signal from the first qubit 10-1 which is transmitted to the third pad 15-3 via the coupling port 13C-1, the pad 16-2, the bonding wire 34C-1, the pad 16-1, and the transmission line 12C-1, transmitted from the third pad 15-3 to the bonding pad 33-3 of the printed circuit board 31 via the bonding wire 34B-1, and transmitted from the bonding pad 33-3 via the transmission line 36-3 and the connector 35-3 of the printed circuit board 31 to the measurement apparatus (not shown). Similarly, when performing testing of the second qubit 10-2 (characteristic evaluation, operation confirmation, etc.), a signal from a measurement apparatus (not shown) is transmitted to the second pad 15-2 of the first quantum chip 1 via the connector 35-4, the transmission line 36-4, and the bonding pad 33-4 of the printed circuit board 31 and the bonding wire 34A-2, and then supplied from the second pad 15-2 to the second qubit 10-2 via the transmission line 12B-2 and the coupling port 13B-2. The state of the second qubit 10-2 at this time may be obtained by measuring a signal from the second qubit 10-2 which is transmitted to the fourth pad 15-4 via the coupling port 13C-2, the pad 16-4, the bonding wire 34C-2, the pad 16-3, and the transmission line 12C-2, transmitted from the fourth pad 15-4 to the bonding pad 33-6 of the printed circuit board 31 via the bonding wire 34B-2, and transmitted from the bonding pad 33-6 via the transmission line 36-6 and the connector 35-6 of the printed circuit board 31 to the measurement apparatus (not shown).

Alternatively, a control signal may be supplied from the measurement apparatus (not shown) to the third pad 15-3 of the first quantum chip 1 via the connector 35-3, the transmission line 36-3, the bonding pad 33-3, the bonding wire 34B-1, and applied from the third pad 15-3 to the first qubit 10-1 via the transmission line 12C-1, the pad 16-1, the bonding wire 34C-1, the pad 16-2, and the coupling port 13C-1. The first qubit 10-1 may be tested using a signal path including the connector 35-1, the transmission line 36-1, the bonding pad 33-1, the bonding wire 34A-1, the first pad 15-1, the transmission line 12B-1, and the coupling port 13B-1 as illustrated in FIG. 6A. Similarly, a control signal may be supplied from the measurement apparatus (not shown) to the fourth pad 15-4 of the first quantum chip 1 via the connector 35-6, the transmission line 36-6, the bonding pad 33-6, the bonding wire 34B-2, and applied from the fourth pad 15-4 to the second qubit 10-2 via the transmission line 12C-2, the pad 16-3, the bonding wire 34C-2, the pad 16-4, and the coupling port 13C-2. The second qubit 10-2 may be tested using a signal path including the connector 35-4, the transmission line 36-4, the bonding pad 33-4, the bonding wire 34A-2, the second pad 15-2, the transmission line 12B-2, and the coupling port 13B-2 as illustrated in FIG. 6A.

As a result of the test, all the bonding wires 34A-1, 34A-2, 34B-1, 34B-2, 34C-1, and 34C-2 are removed from the first quantum chip 1, in which no fail is detected in both first and second qubits 10-1 and 10-2 and which is confirmed to be a good product. In the first quantum chip 1, two sets of paths through the first and second pads 15-1 and 15-2, the transmission lines 12B-1 and 12B-2, and the coupling port 13B-1, 13B-2 are used for input/output of signals to and from the first qubit 10-1 and the second qubit 10-2, respectively, when operating them as elements of the quantum computer (i.e., other than when testing the first qubit 10-1 and the second qubit 10-2). In FIG. 6B, orientation of pads 15-3 and 15-4 is in the horizontal direction simply for the convenience of drawing, but by configuring to arrange the bonding pads 33-3 and 33-6 along upper and lower sides of the opening 32 of the printed circuit board 31, respectively, the orientation of pads 15-3 and 15-4 can be the same as that of the first and second pads 15-1 and 15-2.

Figure 7A:
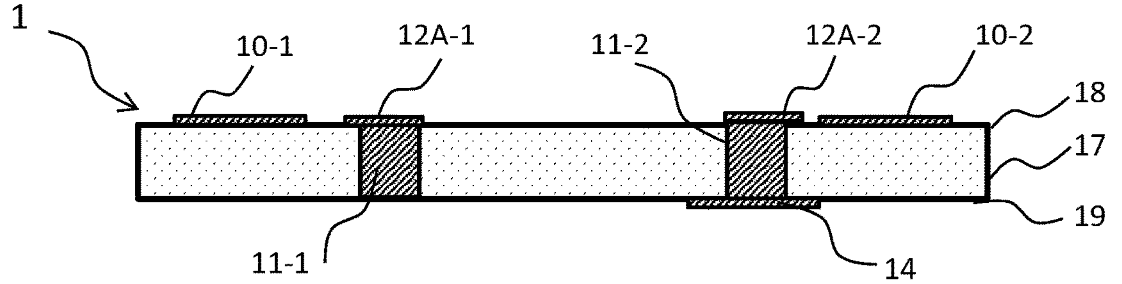
FIG. 7A is a schematic cross-sectional view illustrating a first quantum chip according to one example embodiment.
Figure 7B:
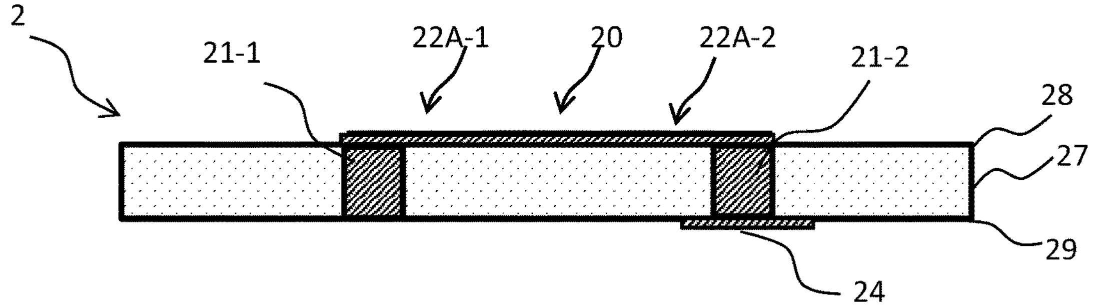
FIG. 7B is a schematic cross-sectional view illustrating a second quantum chip according to one example embodiment.
Figure 7C:
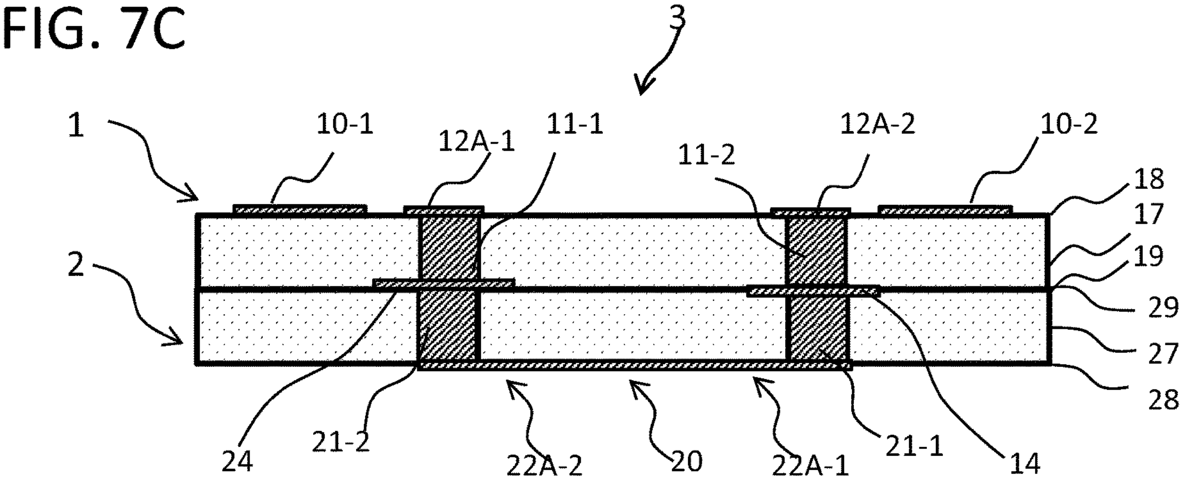
FIG. 7C is a schematic cross-sectional view illustrating a quantum device with the first and second quantum chips bonded (or laminated) together.

FIG. 7A to FIG. 7C illustrate lamination of the first quantum chip 1 and the second quantum chip 2. The second surface (rear surface) 19 of the first quantum chip 1 (FIG. 7A) which has passed the test of the first qubit 10-1 and the second qubit 10-2, and the second surface (rear surface) 29 of the second quantum chip 2 (FIG. 7B) which has passed the test of the coupling circuit 20, are faced to each other and bonded together as illustrated in FIG. 7C. The pad 14 on the second surface 19 of the first quantum chip 1 has one surface in contact with an end surface of the second via 11-2 of the first quantum chip 1 and an opposite surface made in contact with an end surface of the first via 21-1 on the second surface 29 of the second quantum chip 2 to provide secure electrical connection between stacked vias, i.e., the second via 11-2 of the first quantum chip 1 and the first via 21-1 of the second quantum chip 2). The pad 24 on the second surface 29 of the second quantum chip 2 has one surface in contact with an end surface of the second via 21-2 of the second quantum chip 2 and an opposite surface made in contact with an end surface of the first via 11-1 on the second surface 19 of the first quantum chip 1 to provide electrical connection between stacked vias, i.e., the first via 11-1 of the first quantum chip 1 and the second via 21-2 of the second quantum chip 2. The first quantum chip 1 and the second quantum chip 2 may be bonded together by direct bonding of clean front surfaces using, for example, SAB (Surface Activation Bonding), or via a metal intermediate layer such as bump metals.

The bonding wires 34-1 to 34-3 (FIG. 4) used during testing the second quantum chip 2 are removed before the second quantum chip 2 is bonded to the first quantum chip 1. At this time, the bonding wires 34-1 to 34-3 may be physically removed using a tweezer, for example, or burned-off by a focused laser beam. The bonding wires 34-1 to 34-3 are removed to disconnect the coupling circuit 20 from the first pad 25-1 (FIG. 4) which is unnecessary when operating as a quantum computer element. That is, the pads 26-1 and 26-2 are disconnected, and the coupling port 23-1 is disconnected from the first pad 25-1. Similarly, the bonding wires 34A-1, 34A-2, 34B-1, 34B-2, 34C-1, and 34C-2 (FIG. 6A and FIG. 6B) used during testing the first qubit 10-1 and the second qubit 10-2 of first quantum chip 1 are removed.

When bonding the first quantum chip 1 and the second quantum chip 2, position alignment of an end surface of the first via 11-1 at the second surface 19 of the substrate 17 of the first quantum chip 1 and an end surface of the second via 21-2 at the second surface 29 of the substrate 27 of the second quantum chip 2 are performed, and the first via 11-1 of the first quantum chip 1 and the second via 21-2 of the second quantum chip 2 are electrically connected. That is, the first via 11-1 of the first quantum chip 1 and the second via 21-2 of the second quantum chip 2 can be used as a superconducting transmission line not affected by a resistive (ohmic) loss and/or a reflection due to impedance mismatch, or with particular reduction thereof.

According to the present example embodiment, the pad 14 is formed to be in contact with and cover the end surface of the second via 11-2 at the second surface 19 of the substrate 17 of the first quantum chip 1 and the pad 24 is formed to be in contact with and cover the end surface of the second via 21-2 at the second surface 29 of the substrate 27 of the second quantum chip 2. This allows an accuracy in positional alignment to be relaxed and a tolerance to be greatly improved in bonding of the second surface 19 of the first quantum chip 1 and the second surface 29 of the second quantum chip 2.

In the quantum device 3, in which the first quantum chip 1 and the second quantum chip 2 are stacked, the first qubit 10-1 and the second qubit 10-2 are coupled via the coupling ports 13A-1 and 13A-2, the first and second vias 11-1 and 11-2, and the coupling circuit 20.

The quantum device 3 with the stacked structure of the first quantum chip 1 and the second quantum chip 2 according to the present example embodiment, is in a circuit configuration substantially identical to one in which the first qubit 10-1, the second qubit 10-2, and the coupling circuit 20 are fabricated on the same quantum chip (FIG. 3). Before the first quantum chip 1 and the second quantum chip 2 are bonded together, the first qubit 10-1, second qubit 10-2, and the coupling circuit 20 are each subjected to a unit test and the first quantum chip 1, the second quantum chip 2, and the coupling circuit 20 are each verified to be good. Therefore, it is not necessary to connect signal lines for testing, when operating, as an element of the quantum computer, the quantum device 3 with the first quantum chip 1 and the second quantum chip 2 stacked together.

In the above example embodiment, both the first quantum chip 1 and the second quantum chip 2 have vias penetrating through the substrates 17 and 27, respectively. Either one of the first quantum chip 1 and the second quantum chip 2 may have vias. In the following example, the first quantum chip 1 has at least two vias 11-1 and 11-2 penetrating through the substrate 17 as illustrated in FIG. 1, while a second quantum chip 2' has no vias penetrating through the substrate 27. The first quantum chip 1 is similar to that described in the example embodiment above, so the explanation thereof is omitted.

Figure 8A:
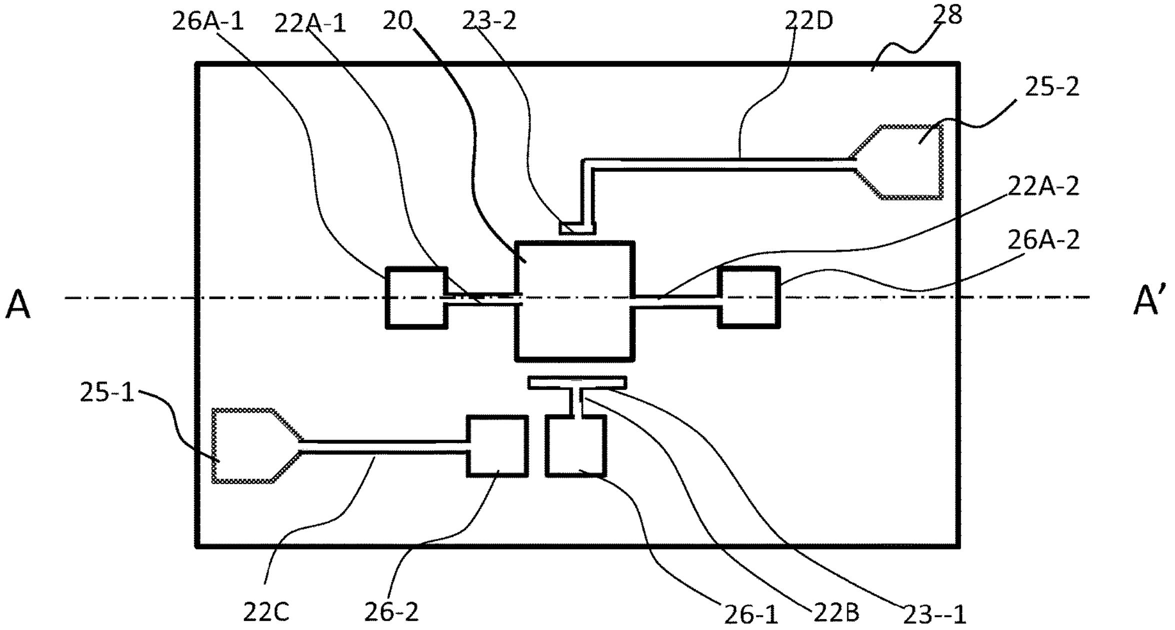
FIG. 8A is a schematic plan view (top plan view) illustrating a second quantum chip according to an other example embodiment.
Figure 8B:
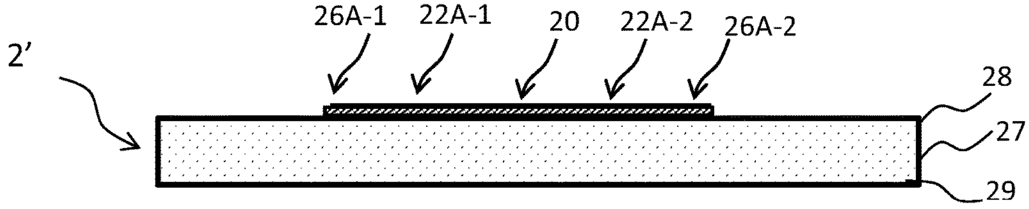
FIG. 8B is a schematic cross-sectional view illustrating the second quantum chip according to the other example embodiment.
Figure 8C:
FIG. 8C is a schematic plan view (bottom plan view) illustrating the second quantum chip according to the other example embodiment.

FIG. 8A is a schematic plan view illustrating a second quantum chip 2'. Referring to FIG. 8A, the second quantum chip 2' includes pads 26A-1 and 26A-2 on the first surface 28 of the substrate 27 mainly made of a superconducting material at locations corresponding to locations of the vias 21-1 and 21-2 in FIG. 2A. As illustrated in FIG. 8B, the second quantum chip 2' is not provided with the vias 21-1 and 21-2 penetrating through the substrate 27. On the second surface 29 of the substrate 27, the pad 24 in FIG. 2C is not formed as illustrated in FIG. 8C. In the second quantum chip 2', the coupling circuit 20, the coupling ports 23-1 and 23-2, the pad 26-1, 26-2, 26A-1, and 26A-2, the transmission lines 22A-1, 22A-2, 22B, 22C, and 22D, and the pads 25-1 and 25-2 are mainly made of a superconducting material. The superconducting material may be the same as that of the first quantum chip 1 and the second quantum chip 2 described with reference to FIGS. 1A-1C and FIGS. 2A-2C. The substrate 27 of the second quantum chip 2' is the same as the substrate 27 of the second quantum chip 2 described with reference to FIG. 2B.

In this example embodiment, when testing the coupling circuit 20 of the second quantum chip 2', the second quantum chip 2' is housed in the opening 32 of the printed circuit board 31, with its second surface 28 of the substrate 27 facing up, the pads 33-1 and 33-4 of the printed circuit board 31 and the first and second pads 25-1 and 25-2 are connected by the bonding wires 34-1 and 34-2, respectively, and further the pads 26-1 and 26-2 are connected by the bonding wires 34-3. As in the example embodiment described above, a high-frequency characteristic evaluation (S-parameter measurement), measurement of a resonance frequency of the coupling circuit 20 (operation confirmation), etc. may be performed using a measurement apparatus (not shown). Alternatively, as in the example embodiment above, the test can be performed by connecting the pads 26-1 and 26-2 by the bonding wire 34-3 and applying a probe (not shown) to the first pad 25-1 and the second pad 25-2 arranged on the first surface 28 of the substrate 27 of second quantum chip 2'. The probe (not shown) is arranged in a test fixture (high-frequency test fixture) or a probe card, not shown which is connected to a measurement apparatus (not shown). In this example embodiment, the first qubit 10-1 and the second qubit 10-2 of the first quantum chip 1 may be tested in the same manner as described with reference to FIG. 6A.

Figure 9A:
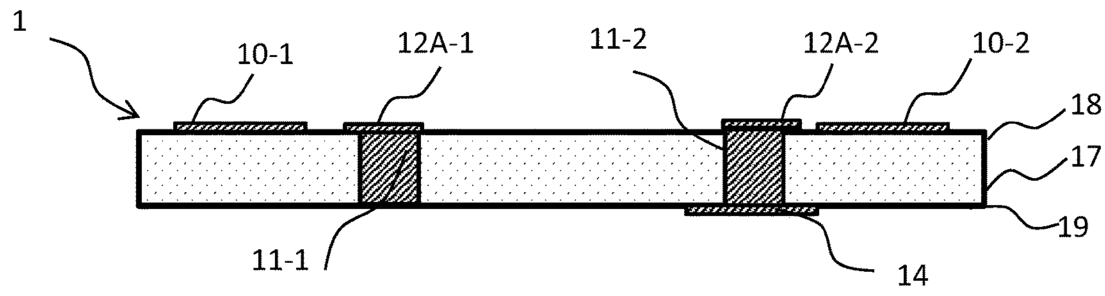
FIG. 9A is a schematic cross-sectional view illustrating an other example embodiment.
Figure 9B:
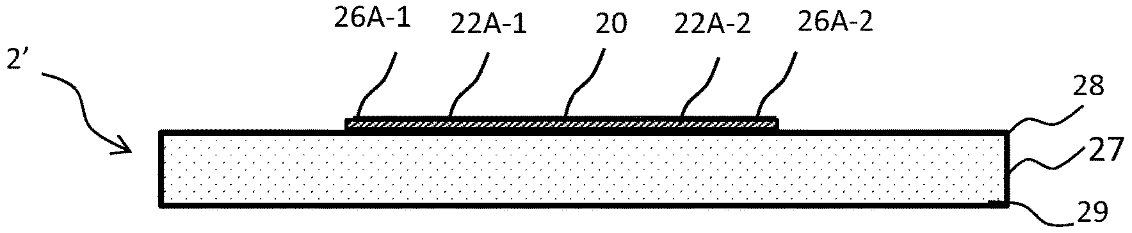
FIG. 9B is a schematic cross-sectional view illustrating the other example embodiment.
Figure 9C:
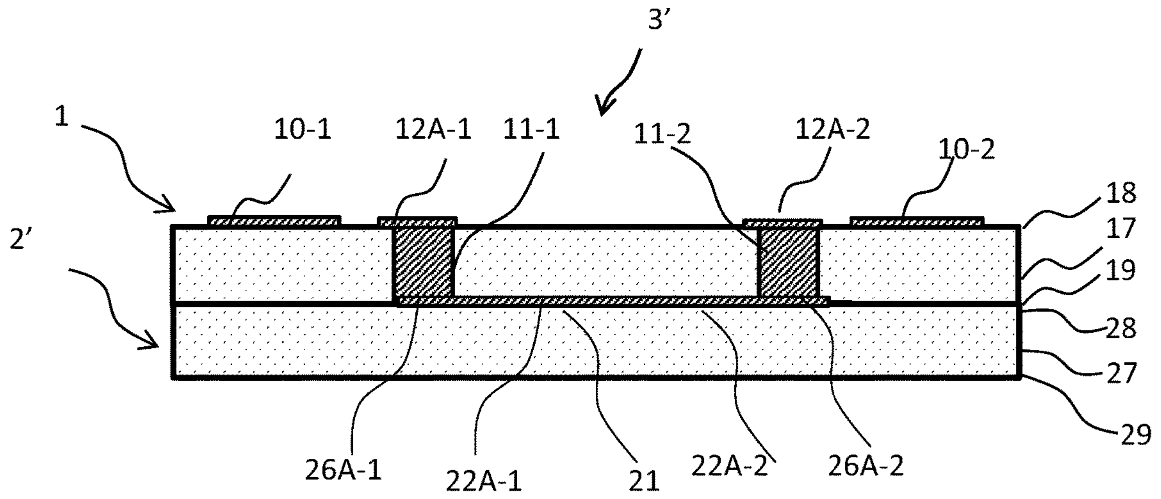
FIG. 9C is a schematic cross-sectional view illustrating the other example embodiment.

In this example embodiment, the first quantum chip 1 and the second quantum chip 2' that have passed the test are also bonded together. FIG. 9A to FIG. 9C illustrate a state in which the first quantum chip 1 and the second quantum chip 2' are bonded together. The second surface (rear surface) 19 of the first quantum chip 1 (FIG. 9A), in which the first qubit 10-1 and the second qubit 10-2 have passed the test, and the second surface (front surface) 28 of the second quantum chip 2' (FIG. 9B), in which the coupling circuit 20 have passed the test, are faced to each other and bonded together as illustrated in FIG. 9C.

While in the example illustrated in FIG. 7A to FIG. 7C, the second surface 19 of the substrate 17 of the first quantum chip 1 and the second surface 29 of the substrate 27 of the second quantum chip 2 are faced to each other and bonded together to form the quantum device 3 (FIG. 7C), in the present example embodiment, the second surface 19 of the substrate 17 of the first quantum chip 1 and the first surface 28 of the substrate 27 of the second quantum chip 2' are faced to each other and bonded together to form a quantum device 3'. The second surface 19 of the substrate 17 of the first quantum chip 1 and the first surface 28 of the substrate 27 of the second quantum chip 2 may be bonded by direct bonding, using, for example, SAB, or by bonding via an intermediate metal layer such as a bump, as with the example illustrated in FIG. 9C.

In this example embodiment, the end surfaces of the first via 11-1 and the second via 11-2 on the second surface 19 of the substrate 17 of the first quantum chip 1 and pad 26A-1 and pad 26A-2 arranged on the first surface 28 of the substrate 27 of the second quantum chip 2' are position-aligned to overlap each other, respectively. This implements a configuration in which the first qubit 10-1 and the second qubit 10-2 are coupled by two-body interaction via the coupling ports 13A-1 and 13A-2, the first and second via 11-1 and 11-2, and the coupling circuit 20.

In this example embodiment, the second quantum chip 2' does not have the vias 21-1 and 21-2 which are provided in the second quantum chip 2 according to FIGS. 2A to 2C. Therefore, processes of drilling via holes penetrating through the substrate 27 and filling a conductive material in the via hole are not necessary, making the fabrication of the second quantum chip 2' easier than that of the second quantum chip 2. In addition, since the second quantum chip 2' have no vias, there is no transmission loss (resistance loss (conductor loss)) due to the vias. On the other hand, the second surface 19 of the substrate 17 of the first quantum chip 1 is in contact with a top surface of the coupling circuit 20. It is noted that attention may be paid to waveform distortion and/or change of an operating frequency in the coupling circuit 20 due to dielectric loss by the substrate 17 of an insulator (dielectric).

In each of the above example embodiments, the configuration that the first qubit 10-1 and the second qubit 10-2 of the first quantum chip 1 are connected to the coupling circuit 20 of the second quantum chip 2 through the first via 11-1 and the second via 11-2, respectively, and the test thereof are described. In a configuration where the first to fourth qubits arranged in the first quantum chip 1 are connected to the coupling circuit (coupling circuit of four-body interaction) in the second quantum chip 2 via the first to fourth vias, respectively, testing of the coupling circuit (e.g., characteristic evaluation and operation confirmation) can be performed by using the same test setup as illustrated in FIG. 4 (a number of vias in FIG. 4 are four).

The above example embodiments can partially or entirely be described as following Supplementary Notes (Notes), though not limited thereto.

(Note 1) A quantum device comprising: a first quantum chip and a second quantum chip stacked to each other, wherein the first quantum chip includes: a first substrate; a first qubit and a second qubit both arranged on a first surface of the first substrate; and a first via and a second via electrically connected to the first qubit and the second qubit arranged on the first surface of the first substrate, respectively, the first via and the second via penetrating through the first substrate from the first surface of the first substrate to a second surface opposite to the first surface of the first substrate, and wherein the second quantum chip includes: a second substrate; a coupling circuit arranged on a first surface of the second substrate; a coupling port coupling to the coupling circuit, on the first surface of the second substrate; and a first pad for input and/or output of a signal for testing of the coupling circuit, on the first surface of the second substrate, the first pad disconnected from the coupling port, wherein the first qubit and the second qubit arranged on the first surface of the first quantum chip are electrically connected respectively via the first via and the second via with the coupling circuit arranged on the first surface of the second quantum chip.

(Note 2) The quantum device according to Note 1, wherein, before the first quantum chip and the second quantum chip assembled into the quantum device, electrical connection between the first pad and the coupling port on the second quantum chip is provided and the coupling circuit of the second quantum chip is subjected to testing, and after the testing of the coupling circuit, the second quantum chip with the electrical connection between the first pad and the coupling port removed and the first quantum chip are bonded to each other.

(Note 3) The quantum device according to Note 1 or 2, wherein the second quantum chip includes a first via and a second via, respectively arranged corresponding to locations of the first via and second via of the first quantum chip on the second surface thereof, the first via and the second via of the second quantum chip each penetrating through the second substrate from the first surface of the second substrate to a second surface of the second substrate opposite to the first surface, the first via and the second via of the second quantum chip being in electrical contact with the coupling circuit, respectively, on the first surface of the second substrate of the second quantum chip, wherein the second surface of the first quantum chip and the second surface of the second quantum chip are faced and bonded to each other.

(Note 4) The quantum device according to Note 3, wherein the first quantum chip further includes a pad disposed on at least one of ends of the first via and the second via on the second surface of the first substrate of the first quantum chip, the pad including a flat portion that is in contact with and covers the at least one of the ends of the first via and the second via of the first substrate of the first quantum chip.

(Note 5) The quantum device according to Note 1 or 2, wherein the second quantum chip includes at least a second pad and a third pad on the first surface of the second substrate, the second pad and the third pad being disposed corresponding to locations of the first via and the second via on of the second surface of the first quantum chip, the second pad and the third pad in electrical contact with coupling circuit, respectively, in the first surface of the second substrate of the second quantum chip, wherein the second surface of the first quantum chip and the first surface of the second quantum chip are faced and bonded to each other.

(Note 6) The quantum device according to Note 5, wherein the first quantum chip further includes a pad at least one of ends of the first via and the second via of the first quantum chip on the second surface of the first substrate, the pad covering the at least one of the ends of the first via and the second via of the first quantum chip.

(Note 7) The quantum device according to Note 1, wherein the second quantum chip further includes, on the first surface of the second substrate:

a second pad connected to the first pad via a first transmission line; and a third pad connected to the coupling port via a second transmission line, wherein the second pad and the third pad are electrically connected by providing a conductive member between the second pad and the third pad when testing the coupling circuit, and wherein the second pad and the third pad are electrically disconnected by removing the conductive member after testing of the coupling circuit.

(Note 8) The quantum device according to Note 1, wherein the first quantum chip includes:

a first pad and a second pad, on the first surface of the first substrate;

a first coupling port coupling to the first qubit on the first surface of the first substrate; and a second coupling port coupling to the second qubit on the first surface of the first substrate, wherein before the first quantum chip and the second quantum chip assembled into the quantum device, under a test setup for testing the first qubit and/or the second qubit on the first quantum chip, the first qubit and/or the second qubit are/is subjected to testing by using the first pad and/or the second pad connected to the first coupling port and/or the second coupling port, after the testing, the first quantum chip with the test setup removed and the second quantum chip are bonded to each other.

(Note 9) The quantum device according to Note 8, wherein, as the test setup, electrical connection between the first pad and the first coupling port of the first quantum chip and/or electrical connection between the second pad and the second coupling port of the first quantum chip, are/is provided and the first qubit and/or the second qubit of the first quantum chip is subjected to testing, and after the testing, the first quantum chip with the electrical connection between the first pad and the first coupling port and/or electrical connection between the second pad and the second coupling port removed and the second quantum chip are bonded to each other.

(Note 10) A method of configuring a quantum device that includes:

a first quantum chip including a first qubit and a second qubit on a first surface of a first substrate; and a second quantum chip including a coupling circuit to couple at least the first qubit and the second qubit, on a first surface of a second substrate, the method comprising:

arranging a first via and a second via in the first substrate, the first via and the second via electrically connecting to the first qubit and a second qubit, respectively, and penetrating through the first substrate of the first quantum chip from the first surface to a second surface opposite to the first surface of the first substrate;

arranging a coupling port for testing of the coupling circuit and a first pad for input and/or output of a signal for testing of the coupling circuit;

providing electrical connection between the first pad on the first surface of the second quantum chip and the coupling port to perform testing of the coupling circuit;

after the testing of the coupling circuit, removing electrical connection between the first pad and the coupling port on the first surface of the second quantum chip; and bonding the first quantum chip and the second quantum chip together, the first qubit and the second qubit of the first quantum chip connected to the coupling circuit of the second quantum chip via the first via and the second via in the first quantum chip bonded to the second quantum chip.

(Note 11) The method according to Note 10, further comprising:

arranging at least a first via and a second via in the second quantum chip, corresponding to locations of the first via and the second via of the first quantum chip on the second surface thereof, the first via and a second via of the second quantum chip each penetrating through the second substrate from the first surface of the second substrate to a second surface opposite to the first surface of the second substrate;

electrically connecting the first via and the second via of the second quantum chip to the coupling circuit of the second quantum chip, respectively, on the first surface of the second substrate of the second quantum chip; and bonding the second surface of the first quantum chip and the second surface of the second quantum chip faced to each other.

(Note 12) The method according to Note 10 or 11, further comprising:

arranging a first pad and a second pad on the first surface of the second substrate of the second quantum chip, corresponding to locations of the first via and the second via of the first quantum chip on the second surface thereof;

connecting electrically the first pad and the second pad to the coupling circuit, respectively; and bonding the second surface of the first quantum chip and the first surface of the second quantum chip faced to each other.

(Note 13) The method according to Note 10 or 11, comprising:

when testing the coupling circuit of the second quantum chip, providing electrical connection between the first pad of the first surface of the second quantum chip and a bonding pad of a printed circuit board on which the second quantum chip is mounted, using a first bonding wire;

providing electrical connection between a second pad and a third pad on the first surface of the second quantum chip, using a second bonding wire, the second pad being connected to the first pad via a first transmission line, the third pad being connected to the coupling port via a second transmission line;

performing testing of the coupling circuit using a first signal and/or a second signal, the first signal being transmitted from a connector mounted on the printed circuit board via the bonding pad of the printed circuit board and the first bonding wire to the first pad of the second quantum chip, and fed to the coupling circuit of the second quantum chip via the first transmission line, the second pad, the second bonding wire, the second transmission line and the coupling port arranged on the second quantum chip, the second signal being transmitted from the coupling circuit of the second quantum chip to the first pad via the coupling port, the second transmission line, the second bonding wire, the second pad and the first transmission line, transmitting from the first pad of the second quantum chip to the bonding pad of the printed circuit board via the first bonding wire, and transmitted from the bonding pad of the printed circuit board to the connector.

(Note 14) A quantum chip comprising:

a substrate;

a quantum circuit element arranged on a first surface of the substrate;

a coupling port coupled to the quantum circuit element, on the first surface of the substrate; and a pad for input and/or output of a signal for testing of the quantum circuit element, on the first surface of the substrate, the pad electrically disconnected from the coupling port, wherein electrical connection is provided between the pad and the coupling port as a test setup for testing of the quantum circuit element, and after the testing of the quantum circuit element, the electrical connection between the first pad and the coupling port is removed and the first quantum chip is bonded to a second quantum chip, with the quantum circuit element in electrical contact with a second quantum circuit element arranged on the second quantum chip.

(Note 15) The quantum chip according to Note 14, where the quantum circuit element is a coupler coupling a plurality of qubits on the second quantum chip, and the second quantum circuit element is one of the qubits.

(Note 16) The quantum chip according to Note 14, where the quantum circuit element is a qubit on the quantum chip, and the second quantum circuit element is a coupler coupling the qubit and other one or more qubits on the quantum chip.

The disclosure of each of PTL 1, NPL 1 and NPL 2 is incorporated herein by reference thereto. Variations and adjustments of the example embodiments and examples are possible within the scope of the overall disclosure (including the claims) of the present invention and based on the basic technical concept of the present invention. Various combinations and selections of various disclosed elements (including the elements in each of the claims, examples, drawings, etc.) are possible within the scope of the claims of the present invention. Namely, the present invention of course includes various variations and modifications that could be made by those skilled in the art according to the overall disclosure including the claims and the technical concept.

What is claimed is:

1. A quantum device comprising:

a first quantum chip and a second quantum chip stacked to each other, wherein the first quantum chip includes:

a first substrate;

a first qubit and a second qubit both arranged on a first surface of the first substrate; and a first via and a second via electrically connected to the first qubit and the second qubit arranged on the first surface of the first substrate, respectively, the first via and the second via each penetrating through the first substrate from the first surface of the first substrate to a second surface opposite to the first surface of the first substrate, and wherein the second quantum chip includes:

a second substrate;

a coupling circuit arranged on a first surface of the second substrate;

a coupling port coupling to the coupling circuit, on the first surface of the second substrate; and a first pad for input and/or output of a signal for testing of the coupling circuit, on the first surface of the second substrate, the first pad disconnected from the coupling port, wherein the first qubit and the second qubit arranged on the first surface of the first quantum chip are electrically connected respectively via the first via and the second via with the coupling circuit arranged on the first surface of the second quantum chip.

2. The quantum device according to claim 1, wherein, before the first quantum chip and the second quantum chip assembled into the quantum device, electrical connection between the first pad and the coupling port on the second quantum chip is provided and the coupling circuit of the second quantum chip is subjected to testing, and after the testing of the coupling circuit, the second quantum chip with the electrical connection between the first pad and the coupling port removed and the first quantum chip are bonded to each other.

3. The quantum device according to claim 1, wherein the second quantum chip includes a first via and a second via, respectively arranged corresponding to locations of the first via and second via of the first quantum chip on the second surface thereof, the first via and the second via of the second quantum chip each penetrating through the second substrate from the first surface of the second substrate to a second surface of the second substrate opposite to the first surface of the second substrate, the first via and the second via of the second quantum chip being in electrical contact with the coupling circuit, respectively, on the first surface of the second substrate of the second quantum chip, wherein the second surface of the first quantum chip and the second surface of the second quantum chip are faced and bonded to each other.

4. The quantum device according to claim 3, wherein the first quantum chip further includes a pad disposed on at least one of ends of the first via and the second via on the second surface of the first substrate of the first quantum chip, the pad including a flat portion that is in contact with and covers the at least one of the ends of the first via and the second via of the first substrate of the first quantum chip.

5. The quantum device according to claim 1, wherein the second quantum chip includes at least a second pad and a third pad on the first surface of the second substrate, the second pad and the third pad being disposed corresponding to locations of the first via and the second via on of the second surface of the first quantum chip, the second pad and the third pad in electrical contact with coupling circuit, respectively, in the first surface of the second substrate of the second quantum chip, wherein the second surface of the first quantum chip and the first surface of the second quantum chip are faced and bonded to each other.

6. The quantum device according to claim 5, wherein the first quantum chip further includes a pad disposed on at least one of ends of the first via and the second via on the second surface of the first substrate of the first quantum chip, the pad including a flat portion that is in contact with and covers the at least one of the ends of the first via and the second via of the first substrate of the first quantum chip.

7. The quantum device according to claim 1, wherein the second quantum chip further includes, on the first surface of the second substrate:

a second pad connected to the first pad via a first transmission line; and a third pad connected to the coupling port via a second transmission line, wherein the second pad and the third pad are electrically connected by providing a conductive member between the second pad and the third pad for testing of the coupling circuit, and wherein the second pad and the third pad are electrically disconnected by removing the conductive member after the testing of the coupling circuit.

8. The quantum device according to claim 1, wherein the first quantum chip includes:

a first pad and a second pad, on the first surface of the first substrate;

a first coupling port coupling to the first qubit on the first surface of the first substrate; and a second coupling port coupling to the second qubit on the first surface of the first substrate, wherein before the first quantum chip and the second quantum chip assembled into the quantum device, under a test setup for testing the first qubit and/or the second qubit on the first quantum chip, the first qubit and/or the second qubit are/is subjected to testing by using the first pad and/or the second pad connected to the first coupling port and/or the second coupling port, and wherein, after the testing, the first quantum chip with the test setup removed and the second quantum chip are bonded to each other.

9. The quantum device according to claim 8, wherein, as the test setup, electrical connection between the first pad and the first coupling port of the first quantum chip and/or electrical connection between the second pad and the second coupling port of the first quantum chip, are/is provided, and the first qubit and/or the second qubit of the first quantum chip is subjected to testing, and wherein, after the testing, the first quantum chip with the electrical connection between the first pad and the first coupling port and/or electrical connection between the second pad and the second coupling port each removed and the second quantum chip are bonded to each other.

10. A method of configuring a quantum device that includes:

a first quantum chip including a first qubit and a second qubit on a first surface of a first substrate; and a second quantum chip including a coupling circuit to couple at least the first qubit and the second qubit, on a first surface of a second substrate, the method comprising:

arranging a first via and a second via in the first substrate of the first quantum chip, the first via and the second via electrically connecting to the first qubit and a second qubit, respectively, and penetrating through the first substrate of the first quantum chip from the first surface of the first substrate to a second surface opposite to the first surface of the first substrate;

arranging, on the first surface of the second substrate of the second quantum chip, a coupling port for testing of the coupling circuit and a first pad for input and/or output of a signal for testing of the coupling circuit;

providing electrical connection between the first pad on the first surface of the second quantum chip and the coupling port to perform testing of the coupling circuit;

after the testing of the coupling circuit, removing electrical connection between the first pad and the coupling port on the first surface of the second quantum chip; and bonding the first quantum chip and the second quantum chip together, the first qubit and the second qubit of the first quantum chip electrically connected to the coupling circuit of the second quantum chip via the first via and the second via in the first quantum chip bonded to the second quantum chip.

11. The method according to claim 10, further comprising:

arranging at least a first via and a second via in the second quantum chip, corresponding to locations of the first via and the second via of the first quantum chip on the second surface thereof, the first via and a second via of the second quantum chip each penetrating through the second substrate from the first surface of the second substrate to a second surface opposite to the first surface of the second substrate;

electrically connecting the first via and the second via of the second quantum chip to the coupling circuit of the second quantum chip, respectively, on the first surface of the second substrate of the second quantum chip; and bonding the second surface of the first quantum chip and the second surface of the second quantum chip faced to each other.

12. The method according to claim 10, further comprising:

arranging a first pad and a second pad on the first surface of the second substrate of the second quantum chip, corresponding to locations of the first via and the second via of the first quantum chip on the second surface thereof;

connecting electrically the first pad and the second pad to the coupling circuit, respectively; and bonding the second surface of the first quantum chip and the first surface of the second quantum chip faced to each other.

13. The method according to claim 10, comprising:

when testing the coupling circuit of the second quantum chip, providing electrical connection between the first pad of the first surface of the second quantum chip and a bonding pad of a printed circuit board on which the second quantum chip is mounted, using a first bonding wire;

providing electrical connection between a second pad and a third pad on the first surface of the second quantum chip, using a second bonding wire, the second pad being connected to the first pad via a first transmission line, the third pad being connected to the coupling port via a second transmission line;

performing testing of the coupling circuit using a first signal and/or a second signal, the first signal being transmitted from a connector mounted on the printed circuit board via the bonding pad of the printed circuit board and the first bonding wire to the first pad of the second quantum chip, and fed to the coupling circuit of the second quantum chip via the first transmission line, the second pad, the second bonding wire, the second transmission line and the coupling port arranged on the second quantum chip, the second signal being transmitted from the coupling circuit of the second quantum chip to the first pad via the coupling port, the second transmission line, the second bonding wire, the second pad and the first transmission line, transmitting from the first pad of the second quantum chip to the bonding pad of the printed circuit board via the first bonding wire, and transmitted from the bonding pad of the printed circuit board to the connector.

14. A quantum chip comprising:

a substrate;

a quantum circuit element arranged on a first surface of the substrate;

a coupling port coupled to the quantum circuit element, on the first surface of the substrate; and a pad for input and/or output of a signal for testing of the quantum circuit element, on the first surface of the substrate, the pad electrically disconnected from the coupling port, wherein electrical connection is provided between the pad and the coupling port as a test setup for testing of the quantum circuit element, and after the testing of the quantum circuit element, the electrical connection between the first pad and the coupling port is removed and the quantum chip is bonded to a second quantum chip, the quantum circuit element of the quantum chip being in electrical connection with a second quantum circuit element arranged on the second quantum chip.

15. The quantum chip according to claim 14, wherein the quantum circuit element is a coupler coupling a plurality of qubits on the second quantum chip, and the second quantum circuit element is one of the qubits.

16. The quantum chip according to claim 14, wherein the quantum circuit element is a qubit on the quantum chip, and the second quantum circuit element is a coupler coupling the qubit and other one or more qubits on the quantum chip.

* * * * *